United States Patent
Yuen et al.

(10) Patent No.: US 8,631,434 B2
(45) Date of Patent: *Jan. 14, 2014

(54) METHOD AND APPARATUS FOR TRANSMITTING AND DOWNLOADING SETUP INFORMATION

(75) Inventors: Henry C. Yuen, Pasadena, CA (US); Daniel S. Kwoh, La Canada, CA (US); Allen Chang, Irvine, CA (US)

(73) Assignee: Index Systems, Inc., Tortola (VG)

(*) Notice: Subject to any disclaimer, the term of this patent is extended or adjusted under 35 U.S.C. 154(b) by 0 days.

This patent is subject to a terminal disclaimer.

(21) Appl. No.: 13/611,865

(22) Filed: Sep. 12, 2012
(Under 37 CFR 1.47)

(65) Prior Publication Data
US 2013/0007834 A1    Jan. 3, 2013

Related U.S. Application Data

(63) Continuation of application No. 13/033,059, filed on Feb. 23, 2011, now Pat. No. 8,296,807, which is a continuation of application No. 11/479,722, filed on Jun. 30, 2006, now Pat. No. 8,122,471, which is a continuation of application No. 10/368,305, filed on Feb. 18, 2003, now abandoned, which is a continuation of application No. 08/694,867, filed on Aug. 9, 1996, now Pat. No. 6,583,825, and a continuation-in-part of application No. 08/335,248, filed on Nov. 7, 1994, now abandoned, and a continuation-in-part of application No. 08/615,567, filed on Mar. 12, 1996, now abandoned, which is a continuation of application No. 08/401,008, filed on Mar. 8, 1995, now abandoned.

(60) Provisional application No. 60/010,023, filed on Jan. 11, 1996, provisional application No. 60/017,703, filed on May 23, 1996.

(51) Int. Cl.
*H04N 7/173* (2011.01)

(52) U.S. Cl.
USPC .................. 725/39; 725/46; 725/50; 725/52; 725/53; 725/132

(58) Field of Classification Search
USPC .................. 725/35, 50, 132, 39, 46, 52, 53
See application file for complete search history.

(56) References Cited

U.S. PATENT DOCUMENTS

| 4,547,804 A | 10/1985 | Greenberg |
| 4,589,017 A | 5/1986 | Tobita |

(Continued)

FOREIGN PATENT DOCUMENTS

| CN | 1132447 A | 10/1996 |
| EP | 0 631 435 | 12/1994 |

(Continued)

OTHER PUBLICATIONS

International Search Report dated Apr. 3, 1997 in PCT application PCT/US97/00739.

(Continued)

*Primary Examiner* — Jivka Rabovianski
(74) *Attorney, Agent, or Firm* — Ropes & Gray LLP

(57) ABSTRACT

Multiple channel maps are embedded in a television transmission and the appropriate channel corresponding to the particular television service used by the viewer is downloaded for use with the television receiver. Each channel map is accompanied by a channel map identifier which identifies the source of the television transmission and a geographic identifier. The source of a television transmission is automatically detected by monitoring the radio-frequency spectrum allocations of telecast stations. The geographic area identifier is determined by comparison with a user inputted geographic area identifier. The channel map having a channel map identifier corresponding to the detected television transmission source and the user inputted geographic area identifier is downloaded and stored for future use.

21 Claims, 17 Drawing Sheets

(56) References Cited

U.S. PATENT DOCUMENTS

| | | |
|---|---|---|
| 4,626,913 A | 12/1986 | Gurumurthy |
| 4,698,670 A | 10/1987 | Matty |
| 4,737,993 A | 4/1988 | DeVilbiss |
| 4,763,195 A | 8/1988 | Tults |
| 4,805,020 A | 2/1989 | Greenberg |
| 4,852,164 A | 7/1989 | Suzuki |
| 4,870,492 A | 9/1989 | Hakamada |
| 4,893,248 A | 1/1990 | Pitts et al. |
| 4,894,714 A | 1/1990 | Christis |
| 4,965,825 A | 10/1990 | Harvey et al. |
| 5,038,211 A | 8/1991 | Hallenbeck |
| 5,045,947 A | 9/1991 | Beery |
| 5,152,011 A | 9/1992 | Schwob |
| 5,255,097 A | 10/1993 | Spiero et al. |
| 5,280,642 A | 1/1994 | Hirata et al. |
| 5,301,028 A | 4/1994 | Banker et al. |
| 5,319,707 A | 6/1994 | Wasilewski et al. |
| 5,329,364 A | 7/1994 | Lee |
| 5,343,300 A | 8/1994 | Hennig |
| 5,355,161 A | 10/1994 | Bird et al. |
| 5,359,601 A | 10/1994 | Wasilewski et al. |
| 5,365,282 A | 11/1994 | Levine |
| 5,371,550 A | 12/1994 | Shibutani et al. |
| 5,379,454 A | 1/1995 | Takegawa et al. |
| 5,382,983 A | 1/1995 | Kwoh et al. |
| 5,414,756 A | 5/1995 | Levine |
| 5,430,491 A | 7/1995 | Park |
| 5,436,653 A | 7/1995 | Ellis et al. |
| 5,465,240 A | 11/1995 | Mankovitz |
| 5,524,237 A | 6/1996 | Bestler et al. |
| 5,544,161 A | 8/1996 | Bigham et al. |
| 5,546,193 A | 8/1996 | Hailey et al. |
| 5,552,837 A | 9/1996 | Mankovitz |
| 5,557,422 A | 9/1996 | Nishigaki |
| 5,559,548 A | 9/1996 | Davis et al. |
| 5,568,179 A | 10/1996 | Diehl et al. |
| 5,576,755 A | 11/1996 | Davis et al. |
| 5,594,938 A | 1/1997 | Engel |
| 5,600,378 A | 2/1997 | Wasilewski |
| 5,619,274 A | 4/1997 | Roop et al. |
| 5,631,707 A | 5/1997 | D'Errico |
| 5,635,996 A | 6/1997 | Okamura |
| 5,661,526 A | 8/1997 | Hamamoto et al. |
| 5,666,645 A | 9/1997 | Thomas et al. |
| 5,668,805 A | 9/1997 | Yoshinobu |
| 6,052,145 A | 4/2000 | Macrae |
| 6,305,018 B1 | 10/2001 | Usui et al. |
| 2005/0105881 A1 | 5/2005 | Mankovitz |

FOREIGN PATENT DOCUMENTS

| | | |
|---|---|---|
| EP | 0 559 344 B1 | 8/1997 |
| EP | 0 624 979 B1 | 1/2000 |
| GB | 2 273 618 | 6/1994 |
| JP | 6-3287204 | 11/1988 |
| JP | 6-020335 | 1/1994 |
| JP | 6-022313 | 1/1994 |
| JP | 6-132785 | 5/1994 |
| JP | 7-046474 | 2/1995 |
| JP | 7-075033 | 3/1995 |
| JP | 7-154350 | 6/1995 |
| WO | WO 93/22877 | 11/1993 |
| WO | WO 93/23957 | 11/1993 |
| WO | WO 94/13096 | 6/1994 |
| WO | WO 94/13107 | 6/1994 |
| WO | WO 94/14279 | 6/1994 |
| WO | WO 94/14281 | 6/1994 |
| WO | WO 94/19910 | 9/1994 |
| WO | WO 95/02942 | 1/1995 |
| WO | WO 95/24098 | 9/1995 |

OTHER PUBLICATIONS

International Preliminary Examination Report dated Feb. 19, 1998, in PCT application PCT/US97/00739.

S. Cherrick, et al., "An Individually Addressable TV Receiver With Interactive Channel Guide Display, VCR, and Cable Box Control", *IEEE Transactions on Consumer Electronics*. IEEE, Aug. 1994, vol. 40, No. 3, pp. 317-328.

FIG. 8

SOURCE MAP (TRANSMITTED IN VBI) 110

| GCH | TELEVISION STATION |
|-----|--------------------|
| 1   | XCBS               |
| 2   | XEYT               |
| 3   | XNBC               |
| 4   | XTLA               |
| 5   | XABC               |

INTERMEDIATE CHANNEL MAP, CABLE CO. B (TRANSMITTED IN VBI) 112

| GCH | TELEVISION STATION |
|-----|--------------------|
| 1   | 2                  |
| 2   | —                  |
| 3   | 4                  |
| 4   | 5                  |
| 5   | 3                  |

FINAL MERGED CHANNEL MAP 114

| GCH | TELEVISION CHANNEL | TELEVISION STATION |
|-----|--------------------|--------------------|
| 1   | 2                  | XCBS               |
| 2   | —                  | XEYT               |
| 3   | 4                  | XNBC               |
| 4   | 5                  | XTLA               |
| 5   | 3                  | XABC               |

FIG. 11

HOST SCHEDULE PACKET

| HOST ID | TIME |
|---|---|
| 0407 | 10:30 60 MIN. <br><br> 19:00 60 MIN. |
| 0426 | 12:30 60 MIN. <br><br> 21:00 60 MIN. |
| | |

FIG. 13

| ZIP CODE | CHANNEL MAP IDENTIFIER | | |
|---|---|---|---|
| 90000–90050; 90300 | 2714 | | |
| 90210 | GCH | CH. MAP CABLE CO. A | CH. MAP CABLE CO. B |
| | 5 | 3 | 3 |
| | ⋮ | ⋮ | ⋮ |
| | 28 | 28 | 29 |
| | CHANNEL MAP IDENTIFIER | 2710 | 2712 |

HOST ID=0407

| GCH | TIME | CURRENT GCH BIT |
|---|---|---|
| 5 | 10:30 60 MIN. | 1 |
| 28 | 14:00 60 MIN. | 0 |

HOST ID=0426

| GCH | TIME | CURRENT GCH BIT |
|---|---|---|
| 5 | 12:30 60 MIN. | 1 |
| 28 | 21:00 60 MIN. | 0 |

FIG.15

| ZIP CODE | HOST ID | MULTI-OTA BIT |
|---|---|---|
| 90000-90100, 90210, 90300-90400 | 0407 | 0 |
| 95000-95500, 95670, 95800-96000 96501-97000 97186 97300 97901-98000 | 0467 | 1 |

METHOD AND APPARATUS FOR TRANSMITTING AND DOWNLOADING SETUP INFORMATION

CROSS-REFERENCES

The present application is a continuation of co-pending U.S. patent application Ser. No. 13/033,059, filed on Feb. 23, 2011, which is a continuation of U.S. patent application Ser. No. 11/479,722, filed on Jun. 30, 2006, now U.S. Pat. No. 8,122,471, which is a continuation of U.S. patent application Ser. No. 10/368,305, filed on Feb. 18, 2003, now abandoned, which is a continuation of patent application Ser. No. 08/694,867, filed on Aug. 9, 1996, now U.S. Pat. No. 6,583,825, which claims the benefit of U.S. Provisional application No. 60/010,023, filed Jan. 11, 1996, now expired, and U.S. Provisional application No. 60/017,703, filed May 23, 1996, now expired, and is a continuation-in-part of U.S. patent application Ser. No. 08/335,248, filed Nov. 7, 1994, now abandoned, and is a continuation-in-part of U.S. patent application Ser. No. 08/615,567, filed Mar. 12, 1996, now abandoned, which is a continuation of U.S. patent application Ser. No. 08/401,008, filed Mar. 8, 1995, now abandoned, all of which are incorporated herein by reference as though set forth in full.

FIELD OF INVENTION

The present invention relates to transmission and reception of data embedded in a television signal, and more particularly, to an automated method and apparatus for transmitting multiple channel maps in a television signal and downloading the channel map corresponding to the particular television service used by the viewer.

BACKGROUND OF THE INVENTIONS

In the field of television broadcasting, radio-frequency ("RF") spectrum allocations are used to define the manner in which the RF spectrum is to be occupied by the television transmission. By way of example, in the United States, television transmissions are divided into two frequency ranges referred to as very-high-frequency (VHF) and ultra-high-frequency (UHF) regions. The VHF region lies roughly in the frequency range of 40 MHz to 200 MHz, while the UHF region extends from about 470 MHz to almost 1.0 GHz. The precise channel and bandwidth assignments include 68 channels, each occupying 6 MHz.

Each television broadcast station ("television station") occupies one channel on the RF spectrum. These channel allocations, however, vary depending upon the particular television service, i.e., satellite transmission, cable service, and over-the-air broadcasts, used by the viewer and the specific geographic area of service. Moreover, each cable service will generally have its own allocations of channels. The table that relates these television stations to their respective channel allocations for any particular television service is sometimes referred to as a channel map. FIG. 1 illustrates examples of three different channel maps for an over-the-air ("OTA") broadcast, and two cable companies, Cable Co. A and Cable Co. B.

With conventional television technology, a printed program guide having the appropriate channel map must be consulted to determine the channel to which the tuner must be set to receive a particular television station. To facilitate this process for the viewer, commercial remote controllers are available equipped with memory for storing the channel map applicable to the particular television service for a given geographic area. The viewer must first set up the remote controller by keying in the entire channel map from the printed program guide manually. Then, when the viewer keys in a particular television station, the controller accesses the channel mapping memory, converts the television station to the applicable channel, and sets the tuner accordingly.

Recently with the advent of systems to set a video cassette recorder (VCR) for unattended recording by means of code numbers, such as used in a commercial system called VCR PLUS+™ or with an onscreen cursor to select programs from a list displayed on the television screen, channel mapping has become a necessity. In these systems, the appropriate channel map must be stored in memory so that when the viewer designates a name of a television station by code number or cursor, the corresponding channel is retrieved from the memory and used to automatically set the tuner.

While these channel mapping features have proven to be a convenient way for programming a VCR, the viewer must still manually enter on the remote controller the entire channel map for the particular television service used by the viewer and the geographic location served. This process increases the complexity of programming the VCR and discourages the use of the unattended recording feature by the viewer.

There have been attempts to automate the process of loading the applicable map into memory. U.S. Pat. No. 4,894,714 to Christis discloses the transmission of a channel map from a television transmitter station as a teletext page. The teletext page is downloaded to a channel mapping memory at the television receivers served by that transmitter. This arrangement requires that each and every cable, satellite, or broadcast service transmit its own channel map which occupies a significant portion of the transmission bandwidth.

Accordingly, there is a current need for a method and apparatus that can reduce the volume of data required to implement the channel mapping function. It is desirable that this method and apparatus be automated, requiring minimal user interface.

SUMMARY OF THE INVENTION

The present invention is directed to an apparatus and method that satisfies this need. There is, therefore provided, according to a preferred embodiment, an apparatus and method for generating a channel map from data embedded in a television transmission. The data is transmitted on at least one channel of the television transmission and includes a plurality of channel maps, each channel map having a channel map identifier associated therewith.

Initially, the source of the television transmission is automatically detected by monitoring a portion of the radio-frequency spectrum allocations of the television stations. A front end tuner is provided for passing a selected channel of the television transmission. A detector, coupled to the tuner output, detects whether a television station has been allocated to each of the channels selected by, preferably, monitoring the stability of the horizontal sync pulses. A controller is coupled to the tuner for selecting the channels to be passed, and determining the source of the television transmission based on the detected television station allocations.

Once the television source is detected, the appropriate channel map can be extracted from the television transmission based on the geographic location of the viewer. The microcontroller commands the tuner to scan the channels and lock on a channel having the data. The microcontroller includes determines the channel map identifier based on a geographic location of the apparatus, and extracts the channel map corresponding to the determined channel map identifier.

BRIEF DESCRIPTION OF THE DRAWINGS

These and other features, aspects, and advantages of the present invention will become better understood with regard to the following description, appended claims, and accompanying drawings where:

FIG. 8 is a diagram representative of a source map data packet, an intermediate channel map packet, and a final merged channel map in accordance with a preferred embodiment of the present invention;

FIG. 11 is a table representative of a host schedule packet in accordance with a preferred embodiment of the present invention;

FIG. 13 is a table representative of a channel map selection packet in accordance with a preferred embodiment of the present invention;

FIG. 14 is a diagram representative of a host schedule packet with current GCH bits in accordance with a preferred embodiment of the present invention;

FIG. 15 is a table representative of a host assignment packet with Multi-OTA bits in accordance with a preferred embodiment of the present invention;

DETAILED DESCRIPTION

In the preferred embodiment of the present invention, channel mapping information is transmitted over one or more designated television stations known as "physical hosts." The channel mapping information transmitted by each physical host includes the channel maps for most or all of the television services carrying that physical host. Accompanying each channel map is a channel map identifier which uniquely identifies the channel map applicable to each television service. The channel map identifiers are preferably postal directory codes ("zipcodes") because viewers in the same local geographic area generally receive the same OTA broadcast or subscribe to the same cable service. Moreover, if several different zipcode areas share the same channel map, further improvement in bandwidth performance can be achieved by forming a zipcode group and sending a single common channel map to that grouped area. Alternatively, the channel map identifiers could be unique codes assigned to the various cable, satellite and broadcast services.

In theory, a single physical host, such as a national cable station, could provide channel mapping information to the entire country. As a practical matter, however, the use of a single physical host to service the entire nation is not very feasible due mainly to data bandwidth limitations. This is because there are so many different cable services throughout the United States, each having a unique channel map, that the volume of data would be so great that a single physical host could not manage all this data while still maintaining a reasonable data repetition rate. Accordingly, a broadcast network distribution system must be established using several physical hosts to deliver channel mapping information across the nation. Preferably, at least one "local physical host" is set up to serve each major metropolitan area. A single "national physical host" may be used to service the remainder of the country including smaller and remote cities.

Figure 2:
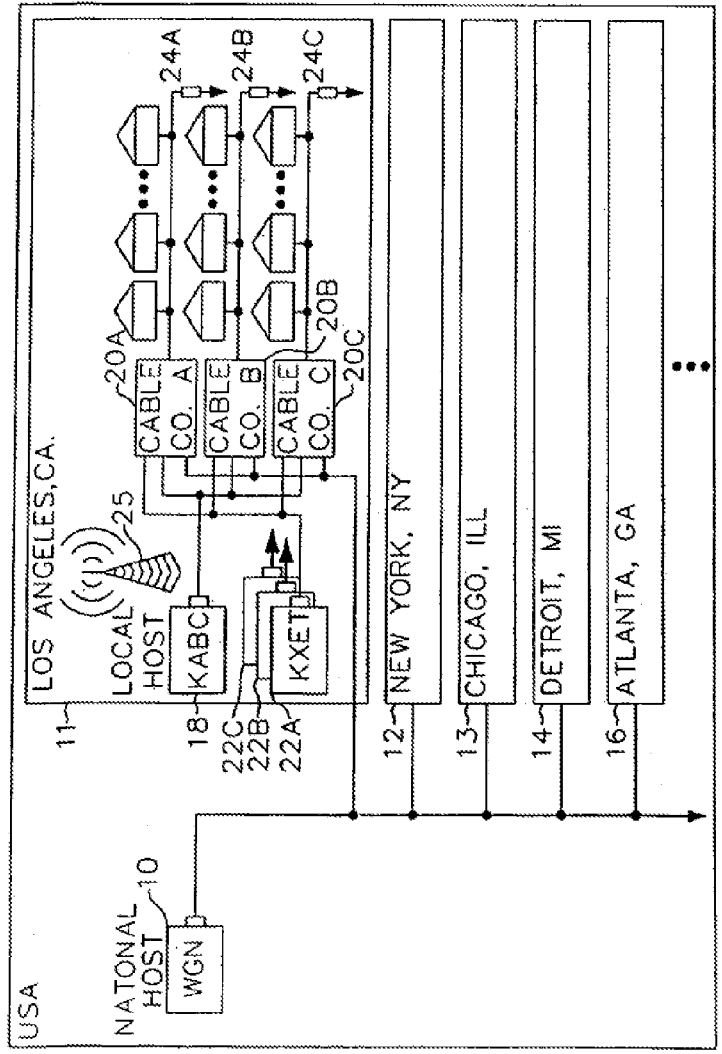
FIG. 2 is a schematic block diagram of a network distribution system in accordance with a preferred embodiment of the present invention.

FIG. 2 shows a typical broadcast network distribution system utilizing both local and national physical hosts. In this embodiment, the national physical host is a national cable station 10, such as WGN, which serves the smaller and rural cities throughout the nation. The major metropolitan areas such as Los Angeles 11, New York 12, Chicago 13, Detroit 14, and Atlanta 16 are served by local physical hosts. For example, in the Los Angeles area a local physical host 18, such as KABC, serves the entire metropolitan area. In this example, both the national cable service and local physical host are coupled to the appropriate cable services 20a-c and combined with television signals from a number of other television stations 22a-c. Each cable service 20a-c has its own channel allocations, and as a result, each cable service has its own channel map. The combined television signals occupying the RF spectrum for each cable service 20a-c are coupled to the appropriate cable trunk 24a-c for distribution to the individual subscribers.

In addition to the above described cable distribution network for the Los Angeles area, the local physical host KABC 18, along with one or more local television stations, provide OTA broadcasts, each broadcasting at a different carrier frequency. Consequently, a separate channel map for OTA broadcasts should be included in the channel mapping information of the local physical host.

Figure 3:
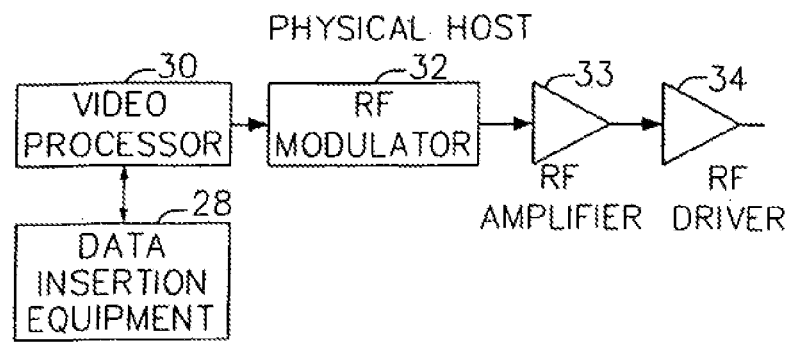
FIG. 3 is a schematic block diagram of a television station transmitter equipped with data insertion equipment for transmitting channel mapping information in accordance with a preferred embodiment of the present invention.

A typical physical host, whether it being a national or local host, is shown in FIG. 3. The physical host is similar to that of any conventional television station facility having a base band video signal from a video processor 30 modulated onto a subcarrier by an RF modulator 32 and coupled to an antenna (not shown) or cable trunk (not shown) through an RF amplifier 33 and a solid-state driver 34. However, unlike conventional television station facilities, the physical host is equipped with data insertion equipment 28 for embedding channel map information into the base band video signal. Preferably, the channel map information is inserted on selected empty lines of the vertical blanking interval ("VBI") of a standard television signal at the video processor 30 to promote commercialization. It is also desirable to transmit the channel mapping information in the same format as closed caption data, and confine the channel mapping information to one VBI line from 10-20, either single field or both fields. Under mandatory FCC requirements effective July 1993, color televisions having a size 13" and greater must provide a closed caption decoder. Thus, this arrangement lowers the overall implementation cost by reducing the peripheral hardware requirements at the receiving end of the transmission since the existing closed caption decoder can be used. Alternatively, the data format may be accelerated to twice the bit rate or more to accommodate bandwidth limitations. Moreover, the channel mapping information may be inserted on multiple VBI lines from 10 to 20.

Caption data decoding is known in the art and described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS"; Title 47, C.F.R., Part 73.682(a)(22), Caption Transmission format; Title 47, C.F.R. Part 73.699, FIG. 6; "TELEVISION SYNCHRONIZING WAVE FORM"; Title 47, C.F.R., Part 73.699, FIG. 17a; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Figure 4:
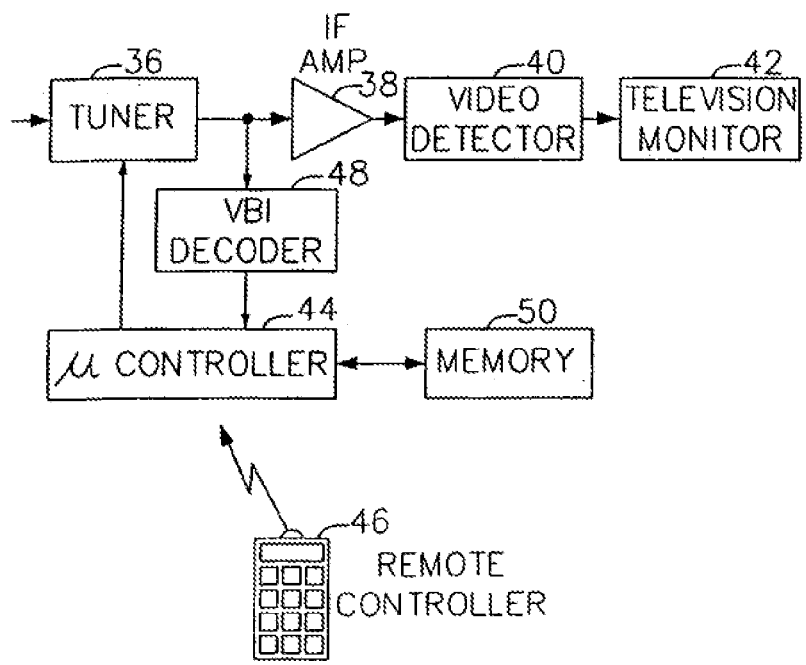
FIG. 4 is a schematic block diagram of a Channel Map Decoder at the point of reception of the television transmission in accordance with a preferred embodiment of the present invention.

To successfully download the appropriate channel map, a Channel Map Decoder is required at the point of reception. FIG. 4 shows an electrical block diagram of a preferred embodiment of the Channel Map Decoder integrated into a conventional television receiver. Alternatively, the Channel Map Decoder may be integrated into a VCR or housed in a stand alone unit. A UHF/VHF tuner 38 is positioned at the front end of the Channel Map Decoder for passing a selected channel of the television transmission. The tuner 38, which can be any conventional tuner in the art, should provide amplification, downconversion and demodulation, as well as frequency tuning. The tuner 36 is coupled by an intermediate frequency ("IF") amplifier 38 to a video detector 40. A base band video signal at the output of the video detector 40 is coupled to a television monitor 42 for presentation to the viewer. The tuner 36 is set by a signal from a microcontroller 44 to the desired channel number. A remote controller 46 is coupled to the microcontroller 44, typically by an infrared communication link, to provide viewer control of the television channels.

The channel mapping function is controlled by a program executed by the microcontroller 44. Initially, the microcontroller 44 controls the tuner 36 to scan the RF spectrum in search of channel mapping information in the VBI portion of the television signal. A VBI decoder 48 positioned at the output of the tuner extracts any data detected in the VBI and couples that data to the microcontroller 44 for processing. Since the channel mapping information can be present on any VBI line, the microcontroller 44 must be capable of programming the VBI to search through all VBI lines. This provides greater versatility and improves bandwidth performance. The complexity of the Channel Map Decoder circuitry can be reduced, however, by limiting the transmission of channel mapping information to a designated VBI line in either one or both fields. Any data extracted by the VBI decoder 48 is processed to determine whether it conforms to a designated format, and if so, whether any channel map information has a channel map identifier corresponding to the television service subscribed to by the viewer. If a channel map identifier is recognized by the microcontroller 44, the accompanying channel map is downloaded into memory 50.

Figure 5:
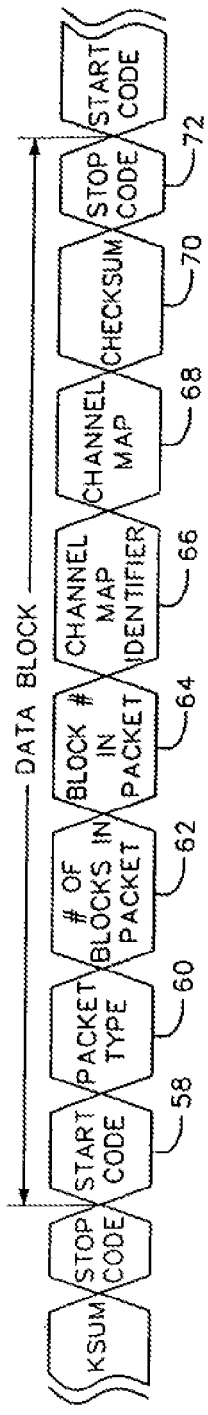
FIG. 5 is a diagram illustrating the data format in accordance with a preferred embodiment of the present invention.

The format of the channel mapping information generated by the physical host comprises VBI encoded "data packets," with each data packet being divided into one or more "data blocks." Each data block is encapsulated with synchronization code, error detection code, and address code by means well known in the art. In some cases it may be preferable to encrypt or scramble the data packets. In the described embodiment thus far, each channel map would be packaged as a data block and all the data blocks transmitted as a single channel map packet. An exemplary data block for a channel map packet is shown in FIG. 5. The data block is arranged into a serial format of data bytes representative of a start code 52, a packet type 54, the number of blocks in the data packet 56, the block number 58, a channel map identifier 60, a channel map 62, a checksum 64 and a stop code 66.

Figure 6:
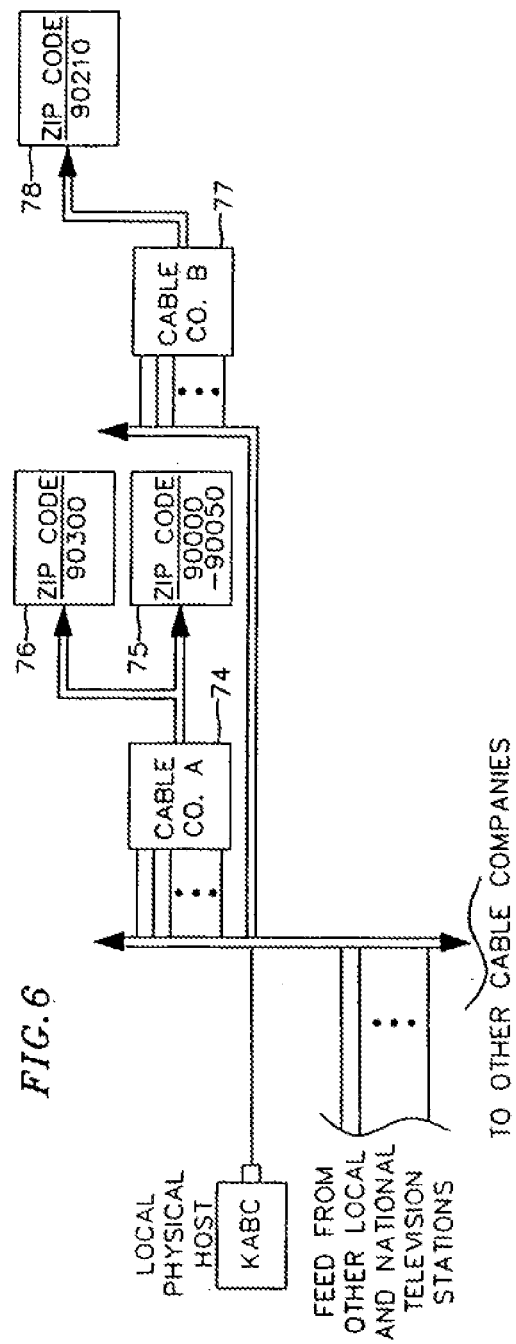
FIG. 6 is a schematic block diagram of a cable distribution network in accordance with a preferred embodiment of the present invention.

As mentioned above, preferably, each channel map identifier corresponds to a zipcode or group of zipcodes. For example, as shown in FIG. 6, viewers located in the zipcodes 90000-90500 (75) and 90300 (76) are served by Cable Co. A 74 and viewers located in the 90210 zipcode 78 are served by Cable Co. B 77. Accordingly, the entire geographic area can be accommodated with just two channel maps, each channel map being accompanied by a unique channel map identifier. To determine the appropriate channel map identifier, a "channel map selection" packet correlating the channel map identifiers to the zip codes is sent from the physical host. The channel map selection packet is used to identify the appropriate channel map identifier in response to a viewer inputted zipcode.

Figure 7:
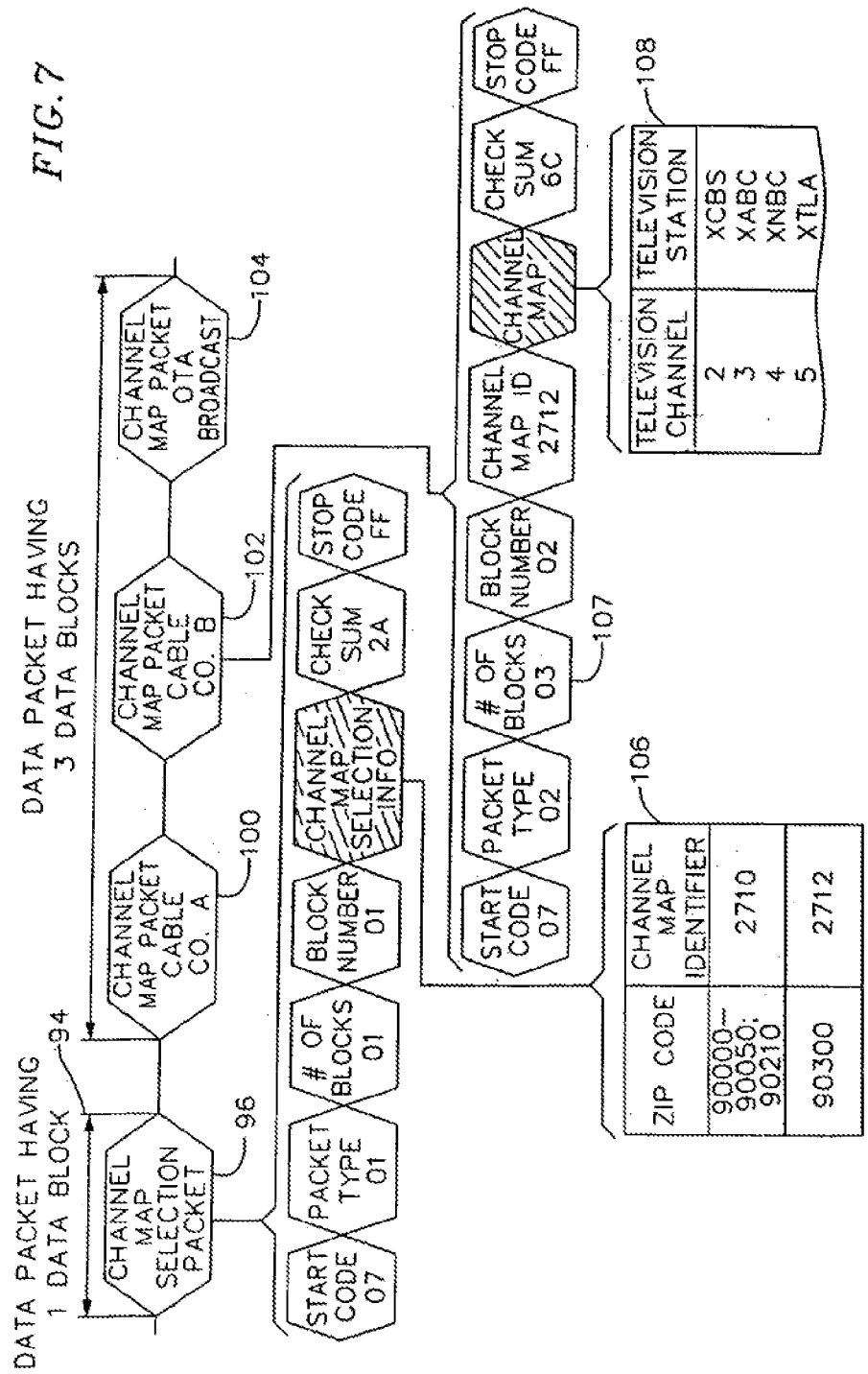
FIG. 7 is diagram illustrating several data blocks in accordance with a preferred embodiment of the present invention.

Turning to FIG. 7, an exemplary broadcast for the two types of data packets described thus far is shown. In this example, a channel map selection packet 94 having one data block 96, and a channel map data packet 98 having three channel map blocks 100, 102, 104 are shown. The three channel map blocks include a channel map block for Cable Co. A, Cable Co. B 102, and an OTA broadcast 104. To illustrate the process implemented by the Channel Map Decoder, consider a viewer located in the geographic area having a zipcode 90300 who subscribes to a cable service. In this example, the Channel Map Decoder scans through the channels to locate the channel map selection packet 94 transmitted in the VBI portion of the television signal. This is accomplished by setting the tuner to a fixed frequency with the microcontroller and extracting the data transmitted in the VBI portion with the VBI decoder 48. The microcontroller then searches for the appropriate start code $(07)_{HEX}$, stop code $(FF)_{HEX}$ and the packet type $(02)_{HEX}$. In this example, $(01)_{HEX}$ represents a channel map selection packet and $(02)_{HEX}$ represents a channel map packet. If the Channel Map Decoder fails to detect the proper start code, stop code and data packet type, the tuner will be scanned to a new fixed frequency. In the event that the Channel Map Decoder successfully detects a channel map selection packet, then the checksum, in this case $(2A)_{HEX}$, will be verified to determine whether a transmission error has occurred. Assuming a valid channel map selection packet is detected, the Channel Map Decoder will search the channel map selection packet 106 for the channel map identifier corresponding to the zipcode 90300. In this case, the Channel Map Decoder will identify and record $(2712)_{HEX}$.

Once the channel map identifier is determined, the Channel Map Decoder searches the remaining blocks of data for the proper start code, stop code, and data packet codes for channel map packets. The proper date packet code for channel maps is $(02)_{HEX}$. In this case three data packets qualify, one for Cable Co. A 100, one for Cable Co. B 102, and one for the OTA broadcast 104. Note that since each data block includes information pertaining to the number of blocks in the data packet 107, the channel map controller can readily ascertain when all the channel map blocks within the data packet have been identified. Once all the channel map blocks have been identified, the microcontroller will locate the data block having the appropriate channel map identifier, in this example $(2712)_{HEX}$, and assuming a valid checksum, download the entire channel map 108 into memory.

Figure 1:
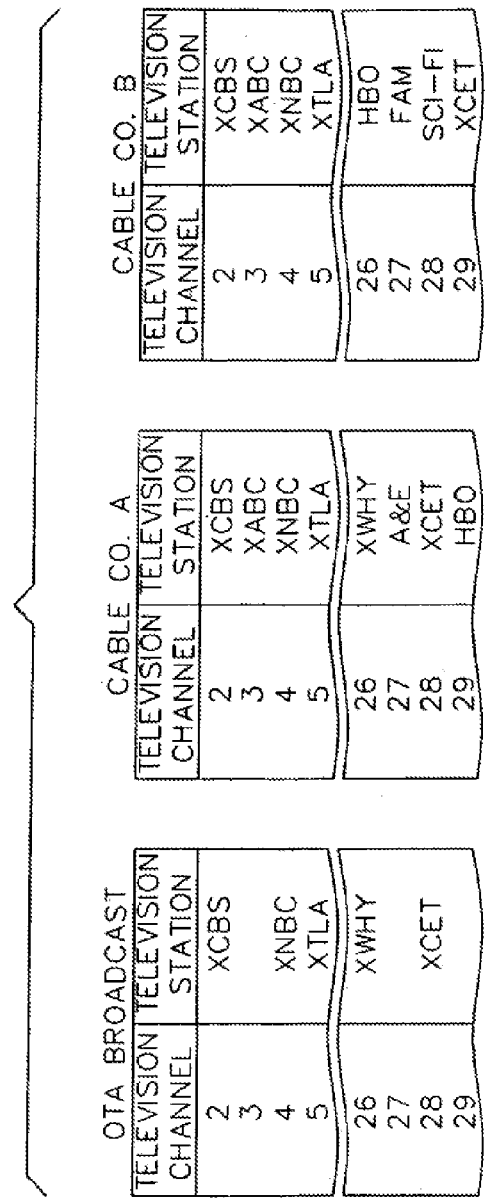
FIG. 1 is a diagram representative of three channel maps in accordance with a preferred embodiment of the present invention.

As discussed above, the channel map 108 relates the television station call letters to their respective channel allocations. These television station call letters typically comprise four letters, each requiring two bytes of data, and therefore occupy a significant portion of the bandwidth. Moreover, these television station call letters are repeatedly transmitted in each channel map block resulting in unnecessary data redundancy. Accordingly, it would be desirable to reduce the volume of data transmitted by the physical host by eliminating the transmission of the television station call letters. This can be achieved by transmitting a third data packet from the physical host known as a "source map" packet. The source map packet contains information relating the call letters of each television station to a reference number, hereinafter referred to as a guide channel ("GCH"). Consequently, the television station call letters would no longer be required to be transmitted with each channel map. Rather, the channel map could be transmitted with GCH numbers correlating to the channel allocations and merged with the source map at the Channel Map Decoded. An example of a source map 110, a channel map 112 for Cable Co. B, and a final merged channel map 114 is shown in FIG. 8. Note that the final merged channel map in FIG. 8 is identical to the channel map for Cable Co. B in FIG. 1.

Figure 9:
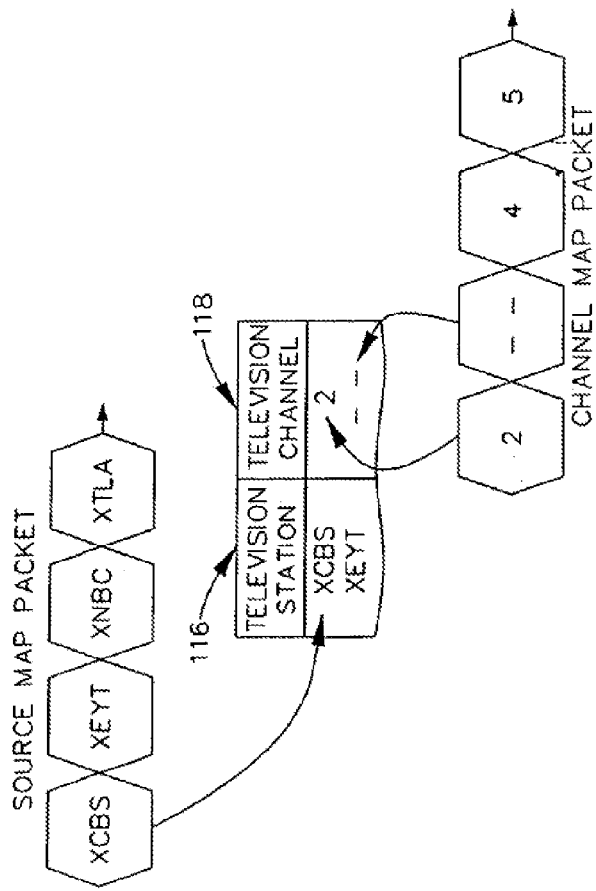
FIG. 9 is a diagram illustrating the creation of the final merged channel map from the data packets of FIG. 8 in accordance with a preferred embodiment of the present invention.

An attractive feature of this approach is that the transmission of the GCH numbers from the physical host can be entirely eliminated. This can be achieved by programming the Channel Map Decoder to record the television station call letters of the source map and the television channel allocations of the channel map in sequential GCH number order. In other words, with respect to the source map, the television station call letters corresponding to GCH 1 is always transmitted first in the serial data stream, followed by the television station call letters corresponding to GCH 2, and so on. Similarly, with respect to the channel map, the television channel allocation corresponding to GCH 1 is transmitted first followed by the television channel allocation for GCH 2. With this approach, the channel map can be easily constructed by simply recording in order the television station call letters from the source map packet in one row 116 and recording in order the television channel allocations from the channel map packet in an adjacent row 118 as shown in FIG. 9.

The use of a source map packet clearly provides improved bandwidth performance of the network distribution system. However, as a practical matter, a single source map cannot be used to service the entire nation, even if the source map packet were transmitted to nationwide viewers through multiple physical hosts. This limitation becomes apparent when one considers the sheer number of television stations operating throughout the country. Moreover, since any given geographic area only transmits a fraction of those television stations, one source map packet would be an incredibly inefficient way to implement the described embodiment. Accordingly, a separate source map packet must be generated for each geographic area. Accompanying each source map is an address tag ("host identifier" or "HOSTID") which uniquely identifies each source map. Preferably, the HOSTID corresponds to a geographic area, such as a zipcode or group of zipcodes. To this end, a fourth data packet known as a "host assignment" packet is generated and transmitted by physical host. The host assignment packet serves to identify the appropriate source map for a given geographical area in a similar manner described above with reference to the channel map identifier. However, the grouping profile of source map packet generally differs from that of the channel map packet. This is because a fairly large geographic region, or even a whole city, can be covered by a single source map. In contrast, the geographic region applicable to any one channel map is limited by the territorial coverage of its respective television service. Accordingly, a single geographic region covered by a HOSTID may include several different channel maps. By way of example, the geographic areas defined by the zipcodes 90000-90100, 90210, and 90300-90400 may be served bye single source map having a HOSTID. Within these zipcode regions, however, Cable Co. A may serve the 90210 zipcode and Cable Co. C may serve the 90300 zipcode. Each cable company would have its own channel map with a unique channel map identifier, however, the entire region could be covered under the same HOSTID.

OTA broadcasters, on the other hand, generally serve a much wider geographic region. Typically, a single OTA broadcaster will serve the entire geographic region defined by the HOSTID. Accordingly, Channel Map Decoders operating in OTA broadcast systems can be programmed to calculate the channel map identifier directly from the HOSTID and thereby eliminate the need to locate and process the channel map selection packet. This increases the overall speed of the system.

The system distribution network described thus far is well suited to provide coverage for the majority of the nation. However, in more densely populated metropolitan areas, such as New York and Los Angeles, where the number of different zipcodes is extremely high, the bandwidth limitations may adversely impact the data repetition rate at which the source map packets and channel map packets can be transmitted. Accordingly, in these densely populated areas, the concept of a "logical host" is introduced to minimize the impact of the bandwidth limitations and reduce the potential for data redundancy. The logical host is an abstract or conceptual host responsible for serving channel map information to a particular group of viewers identified by the same HOSTID. In these densely populated areas, it is desirable to divide the city area into multiple groups, each served by a different logical host. The logical hosts could then be allotted between two or more physical hosts thereby reducing the volume of data that would otherwise be required if a single physical host were used. Conversely, a single national physical host can carry multiple logical hosts to numerous rural or sparsely populated areas thereby reducing the number of physical hosts required to serve the United States.

Figure 10:
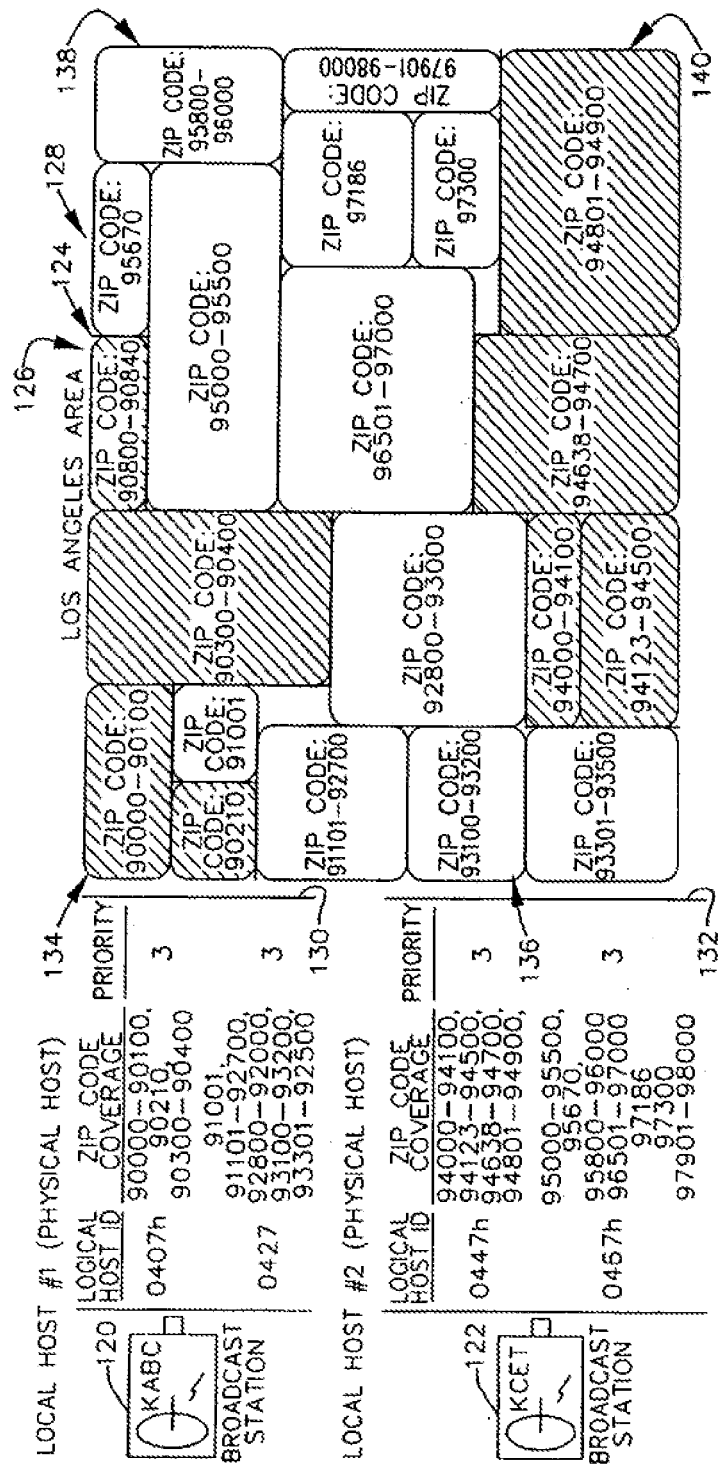
FIG. 10 is a diagram representative of a network distribution system in accordance with a preferred embodiment of the present invention.

The logical host concept is best understood with reference to FIG. 10. In this example, there are two OTA broadcast stations employed as physical hosts, KABC 120 and KCET 122. The network distribution system is simplified by assuming there are no national physical hosts. The entire Los Angeles area is split into a western region 126 and an eastern region 128 by a dividing line 124. The western region 126 is served by KABC and the eastern region 128 is served by KCET. Each physical host station is further divided into two logical hosts by dividing the western and eastern regions into northern and southern regions. Accordingly, there are four logical hosts serving the entire Los Angeles area. The appropriate logical host for any particular zipcode can be ascertained by searching the host assignment packets 130, 132 until a match is found between the viewer zipcode and a zipcode contained in the packet. Referring to the host assignment packets set forth in tabular form, all zipcodes in the northwest region 134 are served by physical host KABC and logical host $0407_{HEX}$, all zipcodes in the southwest region 136 are served by physical host KABC and logical host $0427_{HEX}$, all zipcodes in the northeast region 138 are served by physical host KCET and logical host $0467_{HEX}$, and all zipcodes in the southeast region 140 are served by physical host KCET and logical host $0447_{HEX}$. In summary, the entire Los Angeles area is served by two physical hosts with each physical host carrying two logical hosts.

In some network distribution schemes, it may be desirable to have overlapping logical hosts in a given geographic area. For example, assume that all viewers located in the zipcode range of 91300-91432, with the exception of viewers in the 91356 zipcode, receive the same channel map. With this arrangement, the host assignment packet would correlate a HOSTID to a code representative of the zipcode ranges "91300-91355 and 91357-91432." Of course, the volume of data in the host-assignment packet could be reduced if the zipcode range were simply "91300-91432." This, however, would result in viewers in the 91356 zipcode identifying two logical hosts. Accordingly, optimal packaging of zipcodes could be achieved if an means for arbitrating multiple hosts were implemented. To this end, a priority bit is embedded in the HOSTID. For example, a priority bit of "0" may be included in the HOSTID assigned to the zipcode range of 91300-91432. A priority bit of "1" may be included in the HOSTID assigned to the 91356 zipcode. A Channel Map Decoder operating in the 91356 zipcode would be programmed to recognize both HOSTID's and select the second because of its higher priority. The Channel Map Decoders operating outside the 91356 zipcode would select the former as the HOSTID because it is the only HOSTID assigned. Preferably, four levels of priorities are established using two priority bits to provide greater versatility in designing the broadcast distribution network.

It will be appreciated from the foregoing description that the broadcast distribution network can have numerous applications in addition to the channel mapping features described thus far. For example, data packets can be created at the physical host for transmitting, by way of example, an electronic television program guide. This concept facilitates the selection of television programs to be watched by the viewer. In other words, if an electronic television program could be downloaded from the physical host, the viewer would no longer need to make program selections by scanning the television channels or consulting a television program guide published as a hard copy. Instead, the program listings could simply be recalled from memory by the viewer for display on the television monitor and selected with a cursor for viewing or recording. An example of such an electronic television program guide is disclosed in U.S. patent application Ser. No. 08/475,395 filed Jun. 7, 1995, which is incorporated herein by reference as though set forth in full.

Due to the immense bandwidth requirements of the electronic program guide, however, it cannot feasibly be transmitted around the clock without adversely impacting the data repetition rate of the channel mapping information. Accordingly, the electronic television program guide, or other similar informational data packets, must be transmitted only at scheduled broadcast times. To facilitate this process, it would be useful to know the times the desired data packets are broadcasted. This information can be ascertained through a "host schedule" packet transmitted with the channel mapping information by the physical host. An exemplary host schedule packet in tabular form is shown in FIG. 11. Each host schedule packet is preferably dedicated to a specific geographic area and packaged in individual data blocks accompanied by the appropriate HOSTID. For example, if the viewer is in the geographical area served by the logical host identified by $0407_{HEX}$, then the electronic program guide will broadcast at 10:30 A.M. and again at 7:00 P.M.

The use of a host schedule packet requires that the microcontroller be equipped with an internal clock. Moreover, it would be desirable if the internal clock could be continuously reset to avoid drift and maintain accuracy. Accordingly, a clock data packet containing the current date and time is generated by the physical host and transmitted along with the channel mapping information. Preferably, a single standard reference time "Universal Time Code" or "UTC" is transmitted throughout the United States. This approach further enhances bandwidth performance since a single clock data packet can serve the entire nation without the need for any additional addressing or coding. The UTC in the clock data packet is converted to the applicable timezone, i.e., Eastern Standard Time, Mountain Standard Time, Central Standard Time, Pacific Standard Time, at the Channel Map Decoder through a "timezone" data packet which is also transmitted with the channel mapping information in the VBI portion of the television signal. Preferably, the timezone packet provides a listing of timezones for different zipcode areas, or alternatively for different HOSTIDs. In addition, a daylight savings bit may be included in the data packet to eliminate the need to change the data contents of the timezone packet throughout the year.

Figure 12:
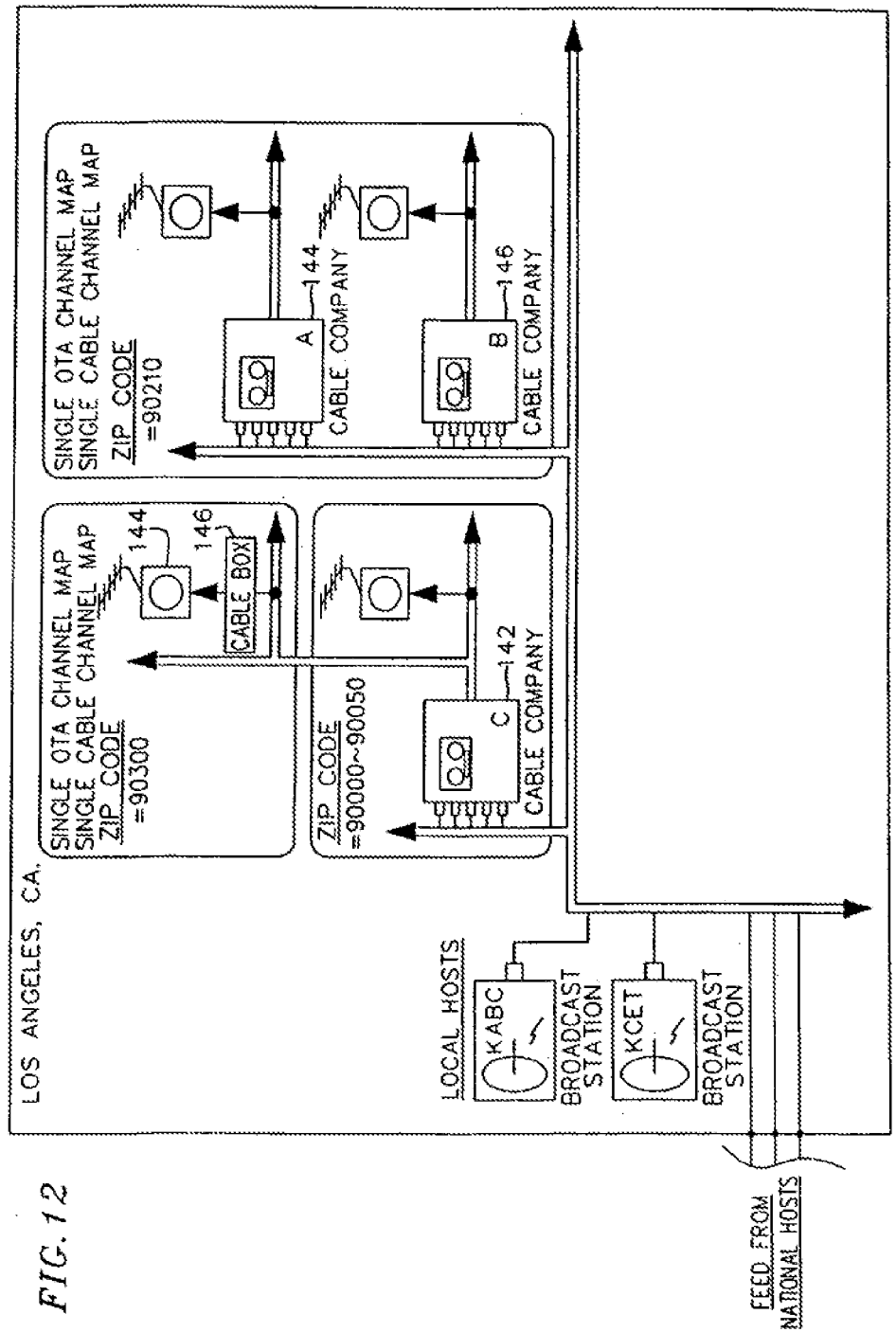
FIG. 12 is a diagram representative of a network distribution system in accordance with a preferred embodiment of the present invention.

The network distribution system described thus far provides efficient and economic packaging of channel mapping information for distribution nationwide. However, it will be appreciated that numerous geographic areas throughout the country will be served by two or more cable companies. Moreover, each cable company may offer both a cable ready service and a cable box service; each having a unique channel map. Finally, each geographic area served by one or more cable companies may also be served by one or more OTA broadcasters. FIG. 12 illustrates a typical broadcast distribution network in a portion of the Los Angeles area. In this example, the geographic areas covered by the zipcode range of 90000-90050 and 90300 are served by Cable Company C 142. In addition, the viewer located in zipcode 90300 has subscribed to a cable box service 146 offered by Cable Co. C 142. Accordingly, the geographic area covered by these zipcodes will have a single OTA broadcast channel map, a single cable channel map, and a single cable box channel map. In contrast, the 90210 zipcode is served by Cable Co. A 144 and Cable Co. B 146, and therefore will have a single OTA broadcast channel map and two cable channel maps. Accordingly, the Channel Map Decoder must be equipped with a means for discriminating between an OTA broadcast, multiple cable ready signals, and a cable box signal.

The initial step in this discrimination process is to determine whether the television transmission is an OTA broadcast or a cable signal. This can be accomplished by monitoring the known RF spectrum allocations for the local area as the frequency spectrum is swept by the tuner. By way of example, it is conventional in the television industry to allocate OTA broadcast stations in the VHF band on alternating channels to minimize interference. For example, in the Los Angeles area, CBS is assigned to channel 2, NBC is assigned to channel 4, and channel 3 is not used. Cable television systems, on the other hand, do not entail OTA transmissions, but rather encompass a system whereby television transmissions are distributed to subscribers by a series of amplifiers and coax cables. The cable television systems generally occupy the same VHF and UHF bands as the OTA broadcast except that the electrical characteristics of the transmissions can be more tightly controlled thereby eliminating the need for channel assignment separation. As a result, the allocation of television stations in a cable system generally occupy all channels to facilitate maximum coverage in the available RF spectrum. Thus, a cable signal can be discriminated from an OTA broadcast by monitoring the local VHF cable channel of the television transmission that would otherwise be unused if the transmission were an OTA broadcast. For example, if a television station is detected on channel 3 in the Los Angeles area, then the television transmission is a cable signal. On the other hand, if the presence of a television station is not detected on channel 3 in the Los Angeles area, then the television transmission is an OTA broadcast.

For viewers without cable ready capability, or alternatively, for those viewers who subscribe to channels having scrambled transmissions, such as HBO, a cable box 146 may be inserted in line between the cable service 142 and the television receiver 144. The tuning of the television station is performed at the cable box which is equipped with a tunable front end narrow bandpass filter (not shown). A video signal from the selected television station is remodulated onto a fixed carrier frequency at the output of the cable box 146 and coupled to the television receiver 144. The television receiver 144 is tuned to the fixed carrier frequency to receive the television transmission, by way of example, channel 3 in the Los Angeles area. Thus, in the Los Angeles area, once a television station's transmission is detected on channel 3, the remaining channels can be scanned to discriminate between a cable ready signal and a cable box signal. If no other television station transmissions are detected on any other channel across the RF spectrum, then the television transmission is a cable box signal. If, on the other hand, numerous television stations are detected as the tuner sweeps the RF spectrum, then the television transmission is a cable ready signal.

This initial discrimination process is dispositive for the geographic area covered by the zipcodes 90000-90050 and 90300. The Channel Map Decoders employed by cable viewers in the zipcodes ranging from 90000-90050 would be able to successfully download the channel map for Cable Co. C subscribers. The Channel Map Decoder used with the television receiver 144 for the viewer residing in the 90300 zipcode would be able to successfully download the channel map for the cable box service offered by Cable Co. C. In addition, the appropriate channel map can also be downloaded for all OTA broadcast viewers regardless of zipcode. However, cable viewers in the 90210 zipcode will require further discrimination to determine whether their provider is Cable Co. A or Cable Co. B.

To resolve this ambiguity, a channel map selection matrix ("CMS matrix") is transmitted in the channel map selection packet to each geographic area having two or more cable services. An exemplary channel map selection packet in tabular form for the geographic areas in FIG. 12 is shown in FIG. 13. Since the zipcode area covered by 9000-900050 and 90300 has only one cable service, the appropriate channel map identifier, $2714_{HEX}$, can be extracted by the Channel Map Decoder directly from the table. In contrast, a CMS matrix 148 is transmitted with zipcode 90210. The CMS matrix provides several or all of the channel map pairs for each cable service in the area. Thus, if the GCH numbers can be ascertained as the channels are scanned, then it may be possible to construct a portion of the channel map and reject channel maps in CMS matrix 148 that are inconsistent.

To determine the GCH numbers, this information must be included in a data packet. In a preferred embodiment, a current GCH bit is included in the host schedule packet. An exemplary host schedule packet having a current GCH bit with the Channel Map Decoder tuned to GCH number 5 is shown in tabular form in FIG. 14. The current GCH bit is used to indicate the GCH number of the television channel that the VCR or television receiver is currently tuned. By way of example, consider a viewer in the zipcode 90210 subscribing to Cable Co. B and having a logical host transmitting channel map information over KABC. When the viewer initiates the downloading process, the Channel Map Decoder will scan the RF spectrum in search of the logical host. In this case, the logical host will be found on channel 3, (see FIG. 1), and the applicable HOSTID, $0407_{HEX}$ (see FIG. 10), will be recorded in the Channel Map Decoder from the host assignment packet. The Channel Map Decoder will then search the host schedule packets without regard to the applicable HOSTID for the current GCH bit. Referring to FIG. 14, the current GCH bit is set to a logic "1" for GCH number 5. In other words, the GCH number of the logical host that is currently tuned in by the Channel Map Decoder is 5. As a result of this information, the Channel Map Decoder can establish the channel map pair:

GCH 5 Television Channel 3

The Channel Map Decoder will continue to scan the RF spectrum in search of multiple logical hosts. When the tuner is tuned to KCET, channel 29 (see FIG. 1), the Channel Map Decoder will detect additional host schedule packets and record the current GCH bit, in this case the current GCH bit is set to a logic "1" for GCH number 28 (not shown). Accordingly, a second channel map pair can be established:

GCH 28 Television Channel 29

This channel mapping pair information is very useful in resolving the CMS matrix. Referring back to the channel map selection packet of FIG. 13, only the channel map for Cable Co. B is consistent with the channel map pairs generated by the Channel Map Decoder. The channel map for Cable Co. A can be rejected because the channel map pair correlating GCH number 28 to television channel 28 from the CMS matrix is simply inconsistent with the channel map pair correlating GCH number 28 to television channel 29 established by the Channel Map Decoder. Thus, the microcontroller can identify Cable Co. B as the television service subscribed to by the viewer and proceed to download the channel map accompanied by the channel map identifier $2712_{HEX}$.

Further discrimination may performed by monitoring any XDS ("Extended Data Service") data. Under the Extended Data Services proposed in the *Recommended Practice for*

*Line* 21 *Data Service*, Electronics Industries Association, ETA-608 (drafts Oct. 12, 1992 and Jun. 17, 1993), the subject matter of which is incorporated herein by reference, additional standardized data may be provided in line 21, field 2 of the vertical blanking interval. This recommended practice includes two closed captioning fields, two text mode fields and the extended data services. The extended data includes, among other information, program name, program length, length into program, channel number, network affiliation, television station call letters, UCT (universal coordinated time) time, time zone, and daylight savings time usage. Accordingly, by utilizing the television station call letters, the Channel Map Decoder can determine the corresponding GCH number using the source map packet and establish additional channel map pairs in much the same manner as described above using the host schedule packets.

It will be appreciated that a condition may arise where the resolution of the CMS matrix results in two or more channel maps. In these situations, more channel map information is required to complete the channel map discrimination process. To resolve this problem, the success rate of automated CMS matrix resolving can be increased by programming the Channel Map Decoder to evaluate both the host schedule packet and XDS data. Alternatively, the number of physical hosts or the number of channels carrying XDS data can be increased. Of course, if every channel were designated as a physical host, then the entire channel map could be constructed by collecting all the acquired channel map pairs. There would be no need to explicitly transmit the channel maps for each television service. In the rare instance when the CMS matrix cannot be resolved by constructing channel map pairs, the CMS matrix could then be presented to the television monitor and the appropriate channel map could be manually selected by the viewer. Alternatively, the viewer may be requested to tune to a particular television station, i.e., HBO, and the Channel Map Decoder can then ascertain additional channel map pairs, by extracting the GCB number for that television station from the source map and correlating that number to the tuned in television channel. This process can continue by tuning in additional channels until a number of channel map pairs sufficient to identify a single channel map in the CMS Matrix is established.

In the above example, a single OTA broadcaster serves the entire geographic area and the channel map identifier can be calculated directly from the HOSTID. However, if the exemplary geographic region were served by multiple OTA broadcasters, a CMS matrix would then need to be resolved in much the same manner described with respect to the multiple cable channel maps above. To circumvent the process of consulting the channel map selection packet to determine whether a CMS matrix exists for an area served by a single OTA broadcaster, it is desirable to include a Multi-OTA bit in the host assignment packet. An exemplary host assignment packet employing this concept is shown in tabular form in FIG. 15. From this figure, it is apparent that a Channel Map Decoder operating in the 90210 zipcode and receiving an OTA broadcast could determine that the area is served by a single OTA broadcaster by examining the Multi-OTA bit, in this case a logic level "0", and commence calculating the channel map identifier from the HOSTID without consulting the channel map selection packet. Conversely, a Channel Map Decoder operating in the 95670 zipcode and receiving an OTA broadcast, would detect a logic level "1" for the Multi-OTA bit indicating the presence of two or more OTA broadcasters in the area. Accordingly, the Channel Map Decoder would-then need to consult the channel map selection packet, to resolve the CMS matrix before downloading the appropriate channel map.

Figure 16:
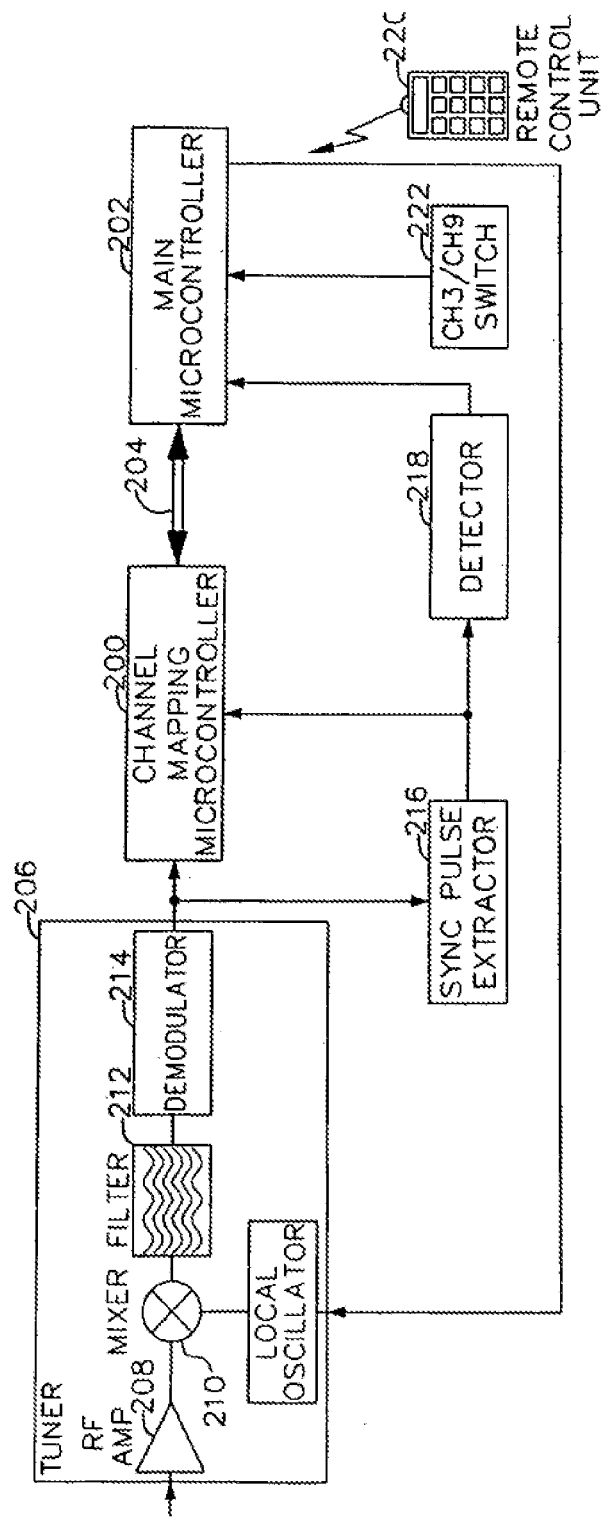
FIG. 16 is an electrical schematic block diagram of the Channel Map Decoder in accordance with a preferred embodiment of the present invention.

Turning to FIG. 16, an electrical block diagram of a preferred embodiment of the Channel Map Decoder is shown. Preferably, a single chip 8-bit microcontroller 200, hereinafter referred to as the "channel mapping microcontroller," is used to implement the channel mapping function. The chip core is a microprocessor, such as a 68HC05CCV from Motorola with 512 byte internal Ram, 12K byte ROM, and a VBI decoder. This chip can embedded into any VCR or television. Alternatively, the channel map decoding functions can be implemented and coded into the existing microcontroller in the VCR or television, provided the system has a VBI decoder.

The channel mapping microcontroller 200 is coded to perform all the channel mapping functions described above. Thus, the manufacturer of the television receiver or VCR need only insert the channel mapping microcontroller 200 into their system, establish communication between the existing microcontroller 202 and the channel mapping microcontroller 200, and code the specific control protocol. Once set, the channel mapping microcontroller 200 will operate under complete control of the existing or main microcontroller 202. Upon completion of the channel mapping process, the channel mapping microcontroller transfers the channel map and the clock to the main microcontroller 202 for storing in internal memory (not shown), and clears its own internal memory (not shown). By storing the ultimate channel mapping information in the main microcontroller 202, the amount of memory required by the channel mapping microcontroller can be minimized.

Preferably, the main microcontroller 202 is also a 68HC05CCV from Motorola. In this configuration, the two microcontrollers can interface through a standard four pin Serial Peripheral Interface ("SPI") bus 204 with a specific protocol. SPI is an interface used by Motorola's microcontroller to allow several SPI microcomputers, or SPI-type peripherals to be interconnected. The SPI bus 204 includes a separate line for data transmission and a separate line for the clock. The SPI system is particularly attractive for the channel mapping function because the system is designed to operate with one master microcontroller controlling one or more slaves. Ideally, the microcontroller 202, the channel mapping microcontroller 200, and other peripheral devices can be configured as a single-master-multi-slave system, in which the channel mapping microcontroller 200 is one of the slave devices. A detailed specification of the SPI bus is disclosed in the "MC68HC05/705CCV—Product Specification" from Motorola and is expressly incorporated herein by reference as though set forth in full.

The main microcontroller 202 provides tuning control of a VHF/UHF tuner 206. The tuner 206, which can be any conventional tuner in the art, is generally implemented with an RF amplifier 208 positioned at the front end of the tuner 206 for receiving the television signal. The RF amplifier 208 should provide initial amplification with good noise figure performance. The output of the RF amplifier 208 is downconverted to an intermediate frequency (IF) by a variable local oscillator (LO) signal at mixer 210. A low pass narrow-band filter 212 is connected at the output of the mixer 210 for passing the difference frequency (IF frequency) of the selected channel. The output of the low pass narrow-band filter 212 is coupled to an IF demodulator 214 for extracting the base band video signal from the IF carrier frequency.

An example of a suitable tuner is a FI1236 tuner manufactured by Phillips Components. The main microcontroller 202 can be programmed to interface with the FI1236 tuner through an inter-IC or I²C-bus. The I²C-bus is a bidirectional 2-wire bus owned and licensed by Phillips Components. The two wires include a serial data line and a serial clock line for carrying tuning information between the main microcontroller 202 and the tuner 206.

The FI1236 tuner includes an RF section and an IF section together on a single printed circuit board. Accordingly, optimal packaging of electronics can be achieved since the tuning, downconversion and demodulation may be performed in the same package. Tuning and bandwidth switching is performed with a conventional digital programming phase lock loop tuning system for controlling the variable local oscillator.

The selected channel at the output of the tuner 206 is coupled to the channel mapping microcontroller and to a sync pulse extractor 216. The sync pulse extractor provides filtering of the composite base band video signal and passes the horizontal and vertical sync pulses to separate outputs. The horizontal and vertical sync pulses are coupled to the channel mapping microcontroller 200. The sync pulses synchronize the channel mapping microcontroller 200 to the base band video signal. The sync pulse extractor may be any conventional device known in the art, by way of example, a LA7218 manufactured by Sanyo Semiconductor Company.

The horizontal sync pulse at the output of the sync pulse extractor is also coupled to a detector 218 to determine the stability of the horizontal sync pulse. By determining the stability of the horizontal sync pulse, the main microcontroller 202 can determine whether a television station has been allocated to that particular channel in the RF spectrum selected by the tuner 206. This determination can be used by the main microcontroller 202 to discriminate between an OTA, a cable ready signal, or a cable box signal.

The detector 218 can be any conventional device known in the art. A cost effective approach for constructing the detector 218 is with a retriggerable one-shot device. The time constant of the one-shot is set for a period greater than the horizontal scan rate so that the one-shot output remains triggered when the tuner is tuned to a channel that has been allocated to a television station. In other words, when the television receiver is tuned to a television station, the horizontal sync pulse is stable and the one-shot output remains at a substantially constant output voltage because the one-shot is continuously retriggered by the horizontal sync pulse prior to timing out. Conversely, if the tuned channel is not one allocated to a television station, the horizontal sync pulse will be asynchronous resulting in random time-outs of the one-shot output. Accordingly, the main microcontroller 202 can determine whether the channel currently tuned in is one in which a television station has been allotted by simply monitoring the output of the one-shot for a constant voltage.

Preferably, a remote control unit 220 is provided for user control of the system. The remote control unit 220 has an infrared ("IR") transmitter which emits a wide band IR signal to an IR detector (not shown) on the main microcontroller 202 in response to a user command. The remote control unit 220 allows the user to select the channel mapping function by merely depressing a key on the unit. The channel mapping select signal is transmitted to the main microcontroller 202 through the IR interface and initiates the channel mapping program stored in internal memory.

Figure 17:
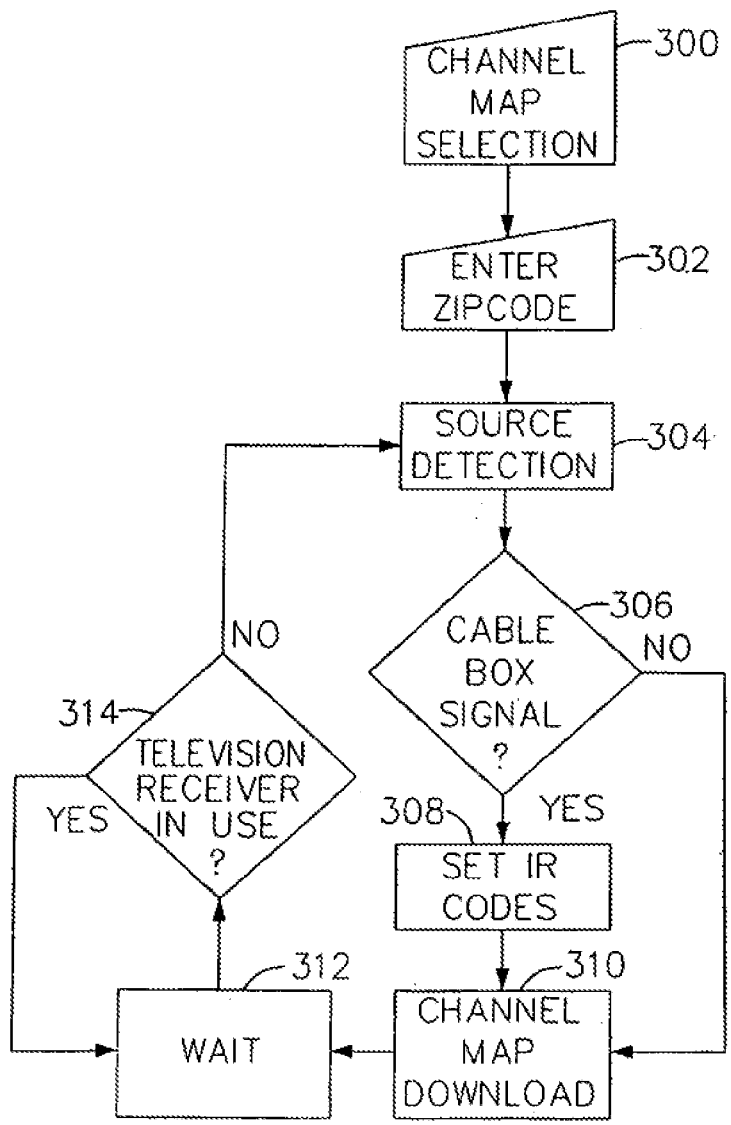
FIG. 17 is a flow diagram illustrating the execution of the channel map downloading program in the Channel Map Decoder in accordance with a preferred embodiment of the present invention.
Figure 18:
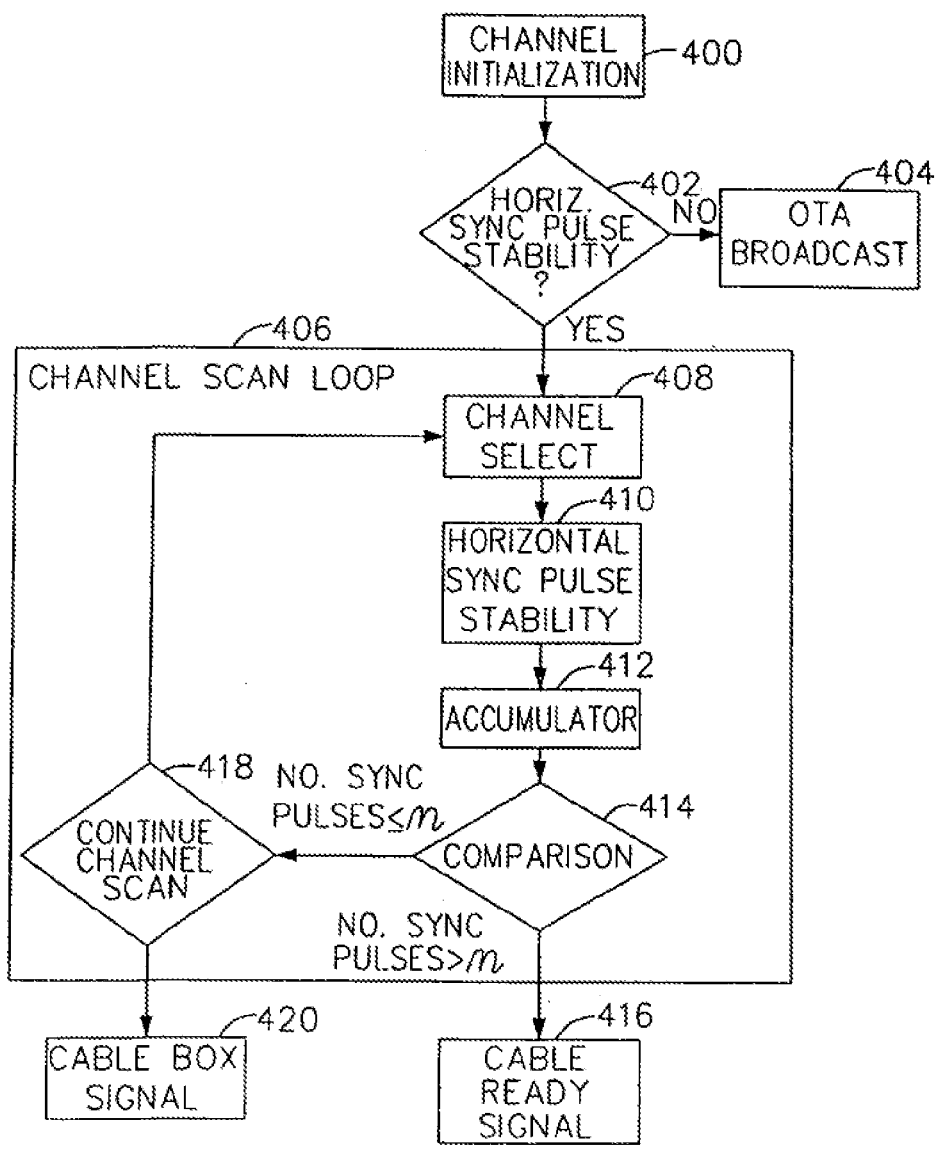
FIG. 18 is a flow diagram illustrating the portion of the channel mapping downloading program pertaining to the determination of the source of the television transmission in accordance with a preferred embodiment of the present invention.
Figure 19A:
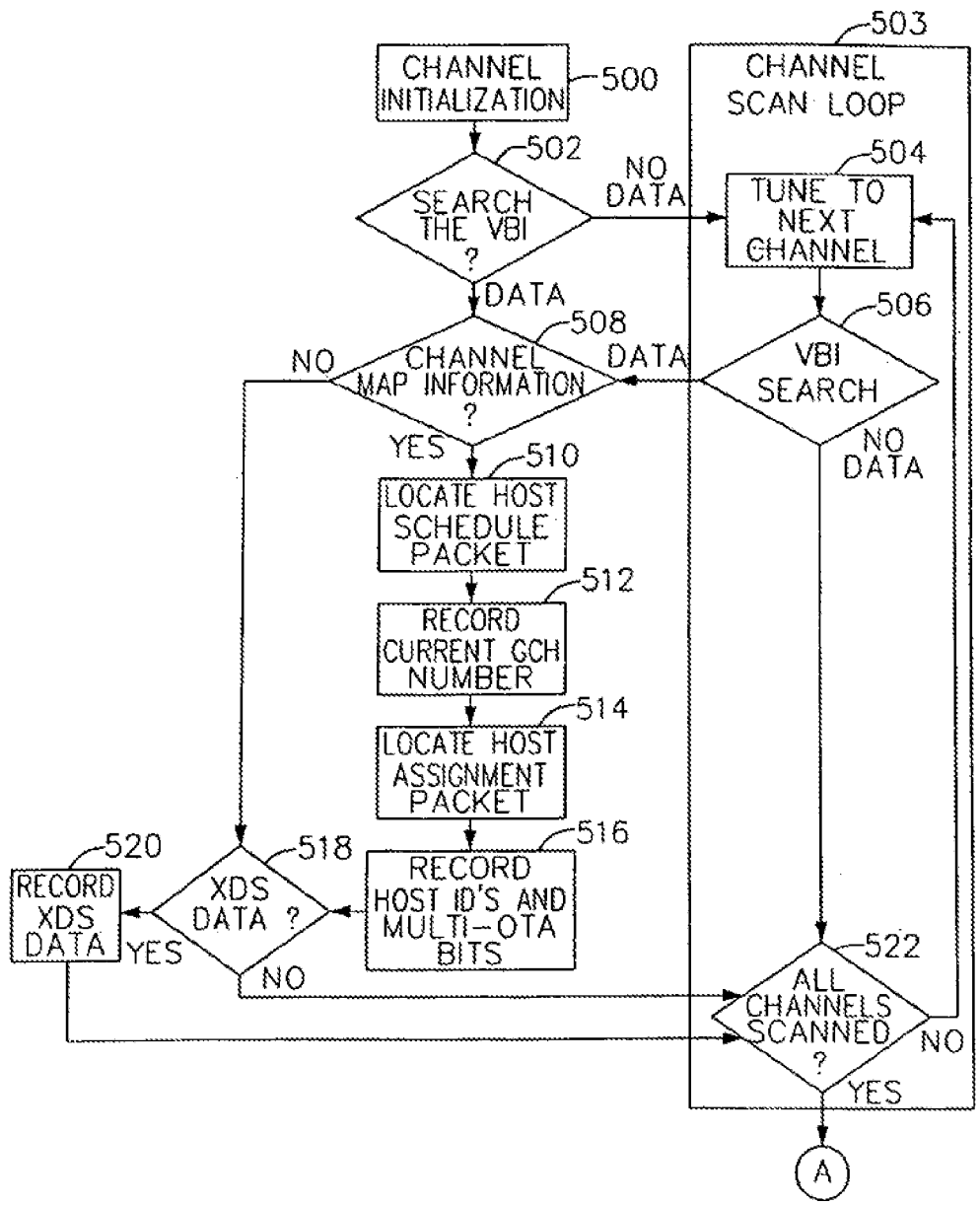
FIGS. 19A, 19B and 19C are flow diagrams illustrating a portion of the channel map downloading program pertaining to the processing of data packets in accordance with a preferred embodiment of the present invention.
Figure 19B:
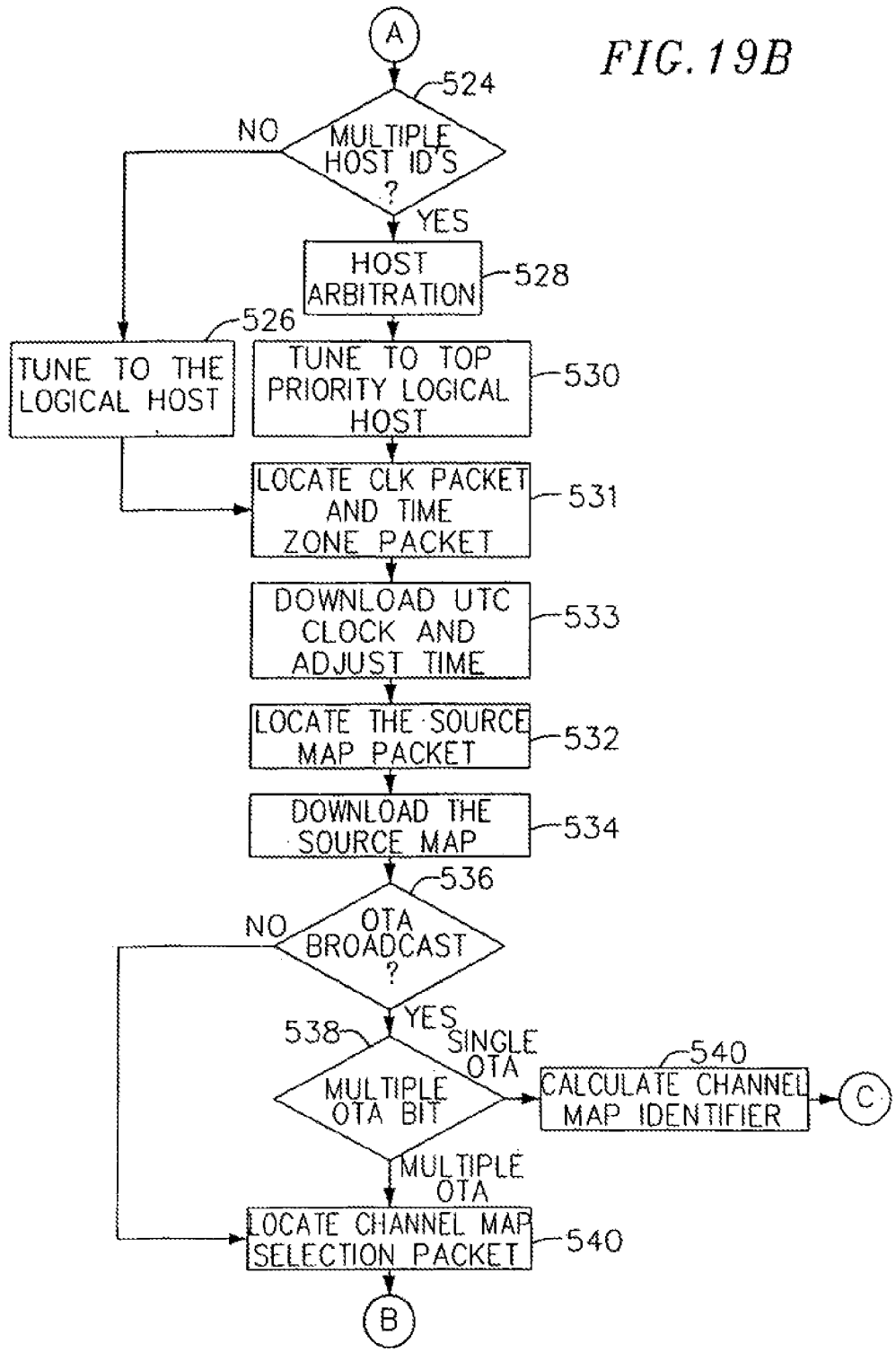
Figure 19C:
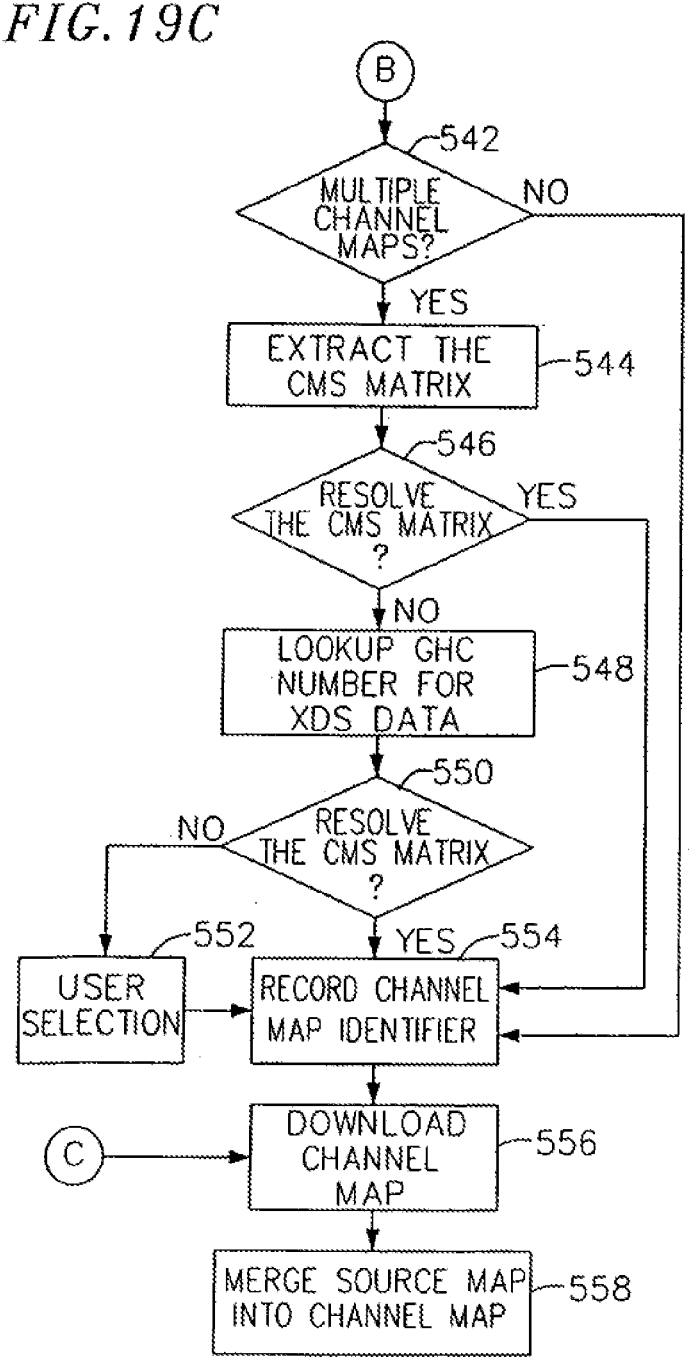

The channel mapping program is best understood with reference to the flow diagrams of FIGS. 17-19. Turning to FIG. 17, once the channel mapping SELECTION 300 is made by the viewer, the main microprocessor will cause the television monitor to prompt the viewer to ENTER the ZIPCODE 302. Once the zipcode is successfully transmitted to the main microcontroller through the IR interface, the main microcontroller will enter into a television transmission SOURCE DETECTION 304 routine. If the main microcontroller determines that the television transmission source is a CABLE BOX SIGNAL 306, a set of IR codes stored in the main microcontroller is transmitted to an IR detector (not shown) in the cable box through an RF blaster (not shown) to SET the IR CODES 308 which are compatible with the cable box in use by means known in the art. This step is necessary to give the main microcontroller control over the tuner in the cable box so that the RF spectrum can be swept to locate channel mapping information. Once the proper IR codes are loaded into the cable box, or alternatively, if the main microcontroller determines that the television transmission is an OTA broadcast or a cable ready signal, then the main microcontroller enters into a CHANNEL MAP DOWNLOAD routine 310. Once the channel map is downloaded, the main microcontroller surrenders control of the tuner to the viewer.

Preferably, the channel-map will be continuously updated by the Channel Map Decoder. Once the initial channel map has been downloaded into memory, the Channel Map Decoder will enter into a WAIT 312 mode. After a predetermined time, the Channel Map Decoder will determine whether the TELEVISION RECEIVER IS IN USE 314. In the event that the television receiver is currently in use, the Channel Map Decoder will re-enter into the WAIT 312 mode. Only when the television receiver is not in use, so as not to disturb the viewer as the television channels are scanned for channel mapping information, will the Channel Map Decoder repeat the execution of the channel mapping program.

Turning to FIG. 18, a flow diagram for the TELEVISION TRANSMISSION SOURCE DETECTION 304 routine is shown. The program begins with a CHANNEL INITIALIZATION 400 routine which selects an initial channel and generates an output representative of the initial channel having an I²C-bus protocol. The initial channel is preferably the local VHF cable channel, by way of example, channel 3 in the Los Angeles area. In the described embodiment, a CH3/CH4 switch 222 (see FIG. 16) is mounted to the television chassis and coupled to the main microcontroller to identify the local VHF cable channel. The CH3/CH4 switch 222 is manually set be the viewer.

The program then proceeds to a HORIZONTAL SYNC PULSE STABILITY 402 routine wherein an input signal is monitored to determine whether the horizontal sync pulse is stable in time. In the described embodiment, a stable horizontal sync pulse is detected if the input signal from the output of the one-shot has a constant voltage level for a predetermined time. If random pulses are detected on the input signal, the main microcontroller determines that the horizontal sync pulse is unstable and therefore a television station has not been allocated to this channel. Based on the absence of a television station on the local VHF cable channel, the main microcontroller determines that the television transmission is an OTA BROADCAST 404. If a stable horizontal sync pulse is detected the television transmission is not an OTA broadcast so the program then enters into a CHANNEL SCAN 406 loop wherein the VHF and lower band UHF channels, preferably channels 2-29, are sequentially stepped through to determine the number of television stations allocated in the particular television transmission. It will be understood, however, by those skilled in the art, that the CHANNEL SCAN 406 loop can be implemented by scanning the VHF and lower band UHF channels in any sequence. The CHANNEL SCAN 406 loop comprises the following routine.

A CHANNEL SELECT 408 routine is entered wherein the channel having the lowest frequency band that has not been previously selected is selected and outputted in a standard I²C-bus protocol. The HORIZONTAL SYNC PULSE STABILITY 410 is monitored to determine whether the horizontal sync pulse is stable. A stable horizontal sync pulse indicates that a television station has been allocated to the selected channel. The ACCUMULATOR 412 routine, which is initially cleared during the CHANNEL INITIALIZATION 400 routine, accumulates the number of channels having a stable horizontal sync pulse during the CHANNEL SCAN 406 loop. A COMPARISON 414 routine is entered wherein the number of television station allocations in the particular television transmission, as determined by the ACCUMULATOR 412 routine, is compared to a threshold number. If such television station allocations exceed the threshold number, the program exits from the CHANNEL SCAN 406 loop and determines that the television transmission is a CABLE READY SIGNAL 416. If such television station allocations do not exceed the threshold, the main microcontroller enters into a CONTINUE CHANNEL SCAN 418 routine to determine whether all the VHF and lower band UHF channels have been selected in the CHANNEL SCAN 406 loop. The CONTINUE CHANNEL SCAN 418 routine causes the program to branch back to the CHANNEL SELECT 408 routine if all the channels have not been selected. Conversely, if all the channels have been selected, the program exits from the CHANNEL SCAN 406 loop and determines that the television transmission is a CABLE BOX SIGNAL 120.

In theory, once a stable horizontal sync pulse is detected in the CHANNEL SCAN 406 loop, a determination can be made that the television transmission is not a cable box signal since the base band video signal output of the cable box is modulated onto a single fixed channel, by way of example, channel 3 in the Los Angeles area. However, certain practical considerations dictate that the threshold number should be greater to increase the accuracy of detection.

The primary consideration is to ensure that the threshold number be high enough to minimize the effects of OTA broadcast interference. OTA broadcasts occupying the VHF bands present a real problem for reliably discriminating between a cable ready signal and a cable box signal. This is mainly due to the power level of VHF transmissions which may result in the parasitic coupling of composite video signals into the system. Of course, known filtering and shielding techniques can be implemented to avoid this problem thereby reducing the threshold number down to as low as one. However, these techniques are rather complex and may drive the overall cost of the system to a point where it is no longer economically feasible. Accordingly, it is more prudent to simply increase the threshold number of stable horizontal sync pulses required as the cable channels are scanned to compensate for this interference potential. In the described embodiment, six or less stable sync pulses is optimal to determine that the cable signal is a cable box signal.

Once the particular television service subscribed to by the viewer is determined, and the appropriate zipcode is entered into memory, the Channel Map Decoder is ready to locate and download the appropriate channel map transmitted from the physical host. This process is implemented by the CHANNEL MAP DOWNLOAD routine 310 stored in the main microcontroller. Referring to FIG. 19, the main microcontroller enters in a CHANNEL INITIALIZATION 500 routine which selects an initial channel and generates an output representative of the initial channel having an I²C-bus protocol. Once the selected channel is tuned, the main microcontroller commands the channel mapping microcontroller, via the SPI bus, to SEARCH THE VBI 502 for data. In the event that the channel mapping microcontroller is unable to locate any data in the VBI, the main microcontroller will enter into a CHANNEL SCAN routine 503 in search of VBI data.

Once the CHANNEL SCAN routine 503 is invoked, the main microcontroller will cause the tuner to TUNE TO THE NEXT CHANNEL 504 and the channel mapping microcontroller will perform another VBI SEARCH 506 on the newly selected channel. Preferably, the main microcontroller will scan the channels sequential, however, it will be understood by those skilled in the art that the channels may be scanned in any order.

In the event that the channel mapping microcontroller detects data in the VBI, either after the CHANNEL INITIALIZATION 500 routine or after tuner is tuned to a different channel 504, the channel mapping microcontroller determines whether the data is CHANNEL MAPPING INFORMATION 508. This requires that the channel mapping microcontroller initiate a validation process which includes confirming the proper data packet format, i.e., the start and stop code and the checksum. If the channel mapping microcontroller determines that the VBI data is channel mapping information, then the channel mapping microcontroller will attempt to LOCATE THE HOST SCHEDULE PACKET 510, and RECORD THE CURRENT GCH NUMBER 512. Subsequently, the channel mapping microcontroller will attempt to LOCATE THE HOST ASSIGNMENT PACKET 514. Once the host assignment packet is located, the channel mapping microcontroller will search for HOSTIDs correlating to its zipcode, and if successfully located, the microcontroller will RECORD THE HOSTIDs and the accompanying MULTI-OTA BITs 516. Once the host assignment packet is searched and the proper information recorded in memory, or alternatively, if the Channel Map Decoder determines that there is no channel mapping information present in the VBI 508, then the Channel Map Decoder will look to VBI line 21 field 2 to locate any XDS DATA 518 and RECORD any XDS DATA 520 found.

Once the HOSTID or HOSTIDs from the host assignment table and the XDS data are recorded in memory, the Channel Map Decoder enters back into the CHANNEL SCAN 503 routine to scan the remaining channels for channel mapping information or XDS data. The main-microcontroller determines whether ALL THE CHANNELS HAVE BEEN SCANNED 522. In the event that all the channels in the RF spectrum have not been scanned, the Channel Map Decoder tunes to the next channel 504. Conversely, if all the channels have been scanned, the Channel Map Decoder exits the CHANNEL SCAN routine 503.

The initial inquiry after all the channels have been scanned for channel mapping information and XDS data is whether MULTIPLE HOSTIDs 524 have been identified. If only one HOSTID has been detected, then the Channel Map Decoder TUNES TO THE LOGICAL HOST 526 identified by that HOSTID. Conversely, if multiple HOSTIDs have been detected, the Channel Map Decoder executes a HOST ARBITRATION 528 routine to determine the highest priority HOSTID assigned to the particular zipcode of the viewer. Once the highest priority HOSTID is successfully arbitrated, the Channel Map Decoder TUNES TO THE TOP PRIORITY LOGICAL HOST 530.

Once tuned to the appropriate logical host, the Channel Map Decoder will attempt to LOCATE THE CLOCK PACKET AND TIMEZONE PACKET 531 and DOWNLOAD THE UTC CLOCK AND ADJUST THE TIME 533. The Channel Map Decoder will then attempt to LOCATE THE SOURCE MAP PACKET 532, and DOWNLOAD THE SOURCE MAP 534 into memory. In the event that the Channel Map Decoder has identified an OTA BROADCAST 536 and the MULTI-OTA BIT 538 indicates a single OTA broadcaster in the zipcode of the viewer, then the CHANNEL MAP IDENTIFIER 540 can be calculated from the HOSTID. If, on the other hand, the Channel Map Decoder has detected a cable transmission 536 or multiple OTA broadcasters in the area, then the Channel Map Decoder will attempt to LOCATE THE CHANNEL MAP SELECTION PACKET 540, and determine whether MULTIPLE CHANNEL MAPS 542 exist for the particular zipcode of the viewer. In the event that multiple channel maps are detected, the Channel Map Decoder will EXTRACT THE CMS MATRIX 544 from the channel map selection packet and attempt to RESOLVE THE CMS MATRIX 546. If the CMS matrix cannot be resolved, then the Channel Map Decoder will LOOK UP THE GCH NUMBER FOR ANY XDS DATA 548 in the source map to further attempt to RESOLVE THE CMS MATRIX 550. It is contemplated that an appropriate number of physical hosts or channels carrying XDS data will be employed to assure resolution of the CMS matrix at this point in the flow diagram. However, in the event that resolution cannot be ascertained based on the channel mapping information and the XDS data currently stored in memory, the CMS matrix will be displayed on the television monitor and the user will be prompted to make a USER SELECTION 552.

Regardless of the method of CMS matrix resolution, the Channel Map Decoder will record the resultant CHANNEL MAP IDENTIFIER 554, and DOWNLOAD THE CHANNEL MAP 556 into memory. If the Channel Map Decoder detects a single channel map 542, then the CHANNEL MAP IDENTIFIER 550 may be recorded directly from the channel map selection table and the channel map DOWNLOADED 556 without CMS resolution. Finally, if the Channel Map Decoder is able to calculate the channel map identifier directly from the HOSTID 540, then the channel map can be DOWNLOADED 556 without consulting the channel map selection packet at all. Once the channel map is downloaded, the Channel Map Decoder MERGES THE SOURCE MAP INTO THE CHANNEL MAP 558 to provide mapping between the channel allocations in the RF spectrum and the call letters of the television stations.

It is apparent from the foregoing that the present invention satisfies an immediate need for a system and method for automating the downloading of channel maps. The features of this channel mapping system may be embodied in other specific forms and used with a wide variety of telecommunication services, without departing from the spirit or essential attributes of the present invention. It is, therefore, desired that the present embodiment be considered in all respects as illustrative and not restrictive, reference being made to the appended claims rather than the foregoing description to indicate the scope of the invention.

What is claimed is:

1. A method performed by a user equipment for determining a mapping of television channels to television stations at a specific geographic location, the method comprising:
   receiving, with a receiver, television signals of a plurality of channels, wherein the television signals include a plurality of channel map identifiers;
   receiving, with a processor, a geographic area identifier;
   scanning, with the processor, the television signals to identify a channel map identifier of the plurality of channel map identifiers based on the received geographic area identifier; and
   determining, with the processor, a channel map corresponding to the identified channel map identifier.

2. The method of claim 1, wherein the determining the channel map corresponding to the identified channel map identifier comprises:
   searching the television signals of the plurality of channels to find a data block having the identified channel map identifier; and
   extracting from the data block the channel map.

3. The method of claim 1, further comprising storing the channel map into a memory.

4. The method of claim 3, further comprising waiting until the user equipment is not in use to store the channel map into the memory.

5. The method of claim 1, wherein at least one of the television signals contain data packets that are divided into data blocks.

6. The method of claim 1, wherein the determining a channel map corresponding to the identified channel map identifier comprises receiving a user input of one of the plurality of channels.

7. The method of claim 1, wherein the received geographic area identifier is a user inputted geographic area identifier comprising a zip code.

8. The method of claim 1, wherein the channel map is used to schedule a recording of programming.

9. The method of claim 1, wherein a channel map packet is used to identify the channel map identifier, of the plurality of channel map identifiers, that is associated with the received geographic area identifier.

10. The method of claim 1, wherein the channel map indicates a mapping of each of the plurality of channels to a corresponding television station of the plurality of television stations for the specific geographic location corresponding to the geographic area identifier.

11. A user equipment for determining a mapping of television channels to television stations at a specific geographic location, the user equipment comprising:
   means for receiving television signals of a plurality of channels, wherein the television signals include a plurality of channel map identifiers;
   means for receiving a geographic area identifier;
   means for scanning the television signals to identify a channel map identifier of the plurality of channel map identifiers based on the received geographic area identifier; and
   means for determining a channel map corresponding to the identified channel map identifier.

12. The user equipment of claim 11, further comprising:
   means for searching the television signals of the plurality of channels to find a data block having the identified channel map identifier; and
   means for extracting from the data block the channel map.

13. The user equipment of claim 11, further comprising means for storing the channel map into a memory.

14. The user equipment of claim 13, further comprising means for waiting until the user equipment is not in use to store the channel map into the memory.

15. The user equipment of claim 11, wherein at least one of the television signals contain data packets that are divided into data blocks.

16. The user equipment of claim 11, further comprising means for receiving a user input of one of the plurality of channels.

17. The user equipment of claim 11, wherein the received geographic area identifier is a user inputted geographic area identifier comprising a zip code.

18. The user equipment of claim 11, wherein the channel map is used to schedule a recording of programming.

19. The user equipment of claim 11, wherein a channel map packet is used to identify the channel map identifier, of the plurality of channel map identifiers, that is associated with the received geographic area identifier.

20. The user equipment of claim 11, wherein the channel map indicates a mapping of each of the plurality of channels to a corresponding television station of the plurality of television stations for the specific geographic location corresponding to the geographic area identifier.

21. A system for determining a mapping of television channels to television stations at a specific geographic location, the system comprising:
- a receiver configured to receive television signals of a plurality of channels, wherein the television signals include a plurality of channel map identifiers; and
- a processor configured to:
    - receive a geographic area identifier;
    - scan the television signals to identify a channel map identifier of the plurality of channel map identifiers based on the received geographic area identifier; and
    - determine a channel map corresponding to the identified channel map identifier.

\* \* \* \* \*